United States Patent
Mishra et al.

(10) Patent No.: US 12,505,062 B2
(45) Date of Patent: Dec. 23, 2025

(54) ASYNCHRONOUS DOUBLE DATA-LANE DDR (ADL-DDR)

(71) Applicant: QUALCOMM Incorporated, San Diego, CA (US)

(72) Inventors: Lalan Jee Mishra, Escondido, CA (US); Umesh Srikantiah, San Diego, CA (US); Radu Pitigoi-Aron, San Jose, CA (US); Richard Dominic Wietfeldt, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 171 days.

(21) Appl. No.: 18/543,931

(22) Filed: Dec. 18, 2023

(65) Prior Publication Data
US 2025/0199992 A1   Jun. 19, 2025

(51) Int. Cl.
G06F 13/42 (2006.01)

(52) U.S. Cl.
CPC .. *G06F 13/4282* (2013.01); *G06F 2213/0002* (2013.01)

(58) Field of Classification Search
CPC .............. G06F 13/4282; G06F 2213/0002
See application file for complete search history.

(56) References Cited

U.S. PATENT DOCUMENTS

| | | | |
|---|---|---|---|
| 2006/0020733 A1* | 1/2006 | Sarda | G06F 13/4291 710/305 |
| 2006/0291569 A1* | 12/2006 | Kabuto | H04N 21/4334 348/E5.002 |
| 2018/0039598 A1* | 2/2018 | Mishra | G06F 13/364 |
| 2019/0171609 A1* | 6/2019 | Mishra | G06F 13/4022 |

* cited by examiner

Primary Examiner — Eric T Oberly
(74) Attorney, Agent, or Firm — Loza & Loza, LLP

(57) ABSTRACT

A method for transmitting data over a serial bus includes transmitting two bits of data over a first wire of a serial bus in each cycle of a plurality of cycles of a transmitter clock signal, transmitting a synchronization pattern over a second wire of the serial bus in a first cycle in the plurality of cycles of the transmitter clock signal, and transmitting two bits of data over the second wire of the serial bus in each cycle of the plurality of cycles of the transmitter clock signal except for the first cycle in the plurality of cycles of the transmitter clock signal. In one example, 16 bits of data and 2 parity bits are transmitted in five cycles of the plurality of cycles of the transmitter clock signal.

20 Claims, 16 Drawing Sheets

ASYNCHRONOUS DOUBLE DATA-LANE DDR (ADL-DDR)

TECHNICAL FIELD

The present disclosure relates generally to serial communication and, more particularly, to encoding techniques for a Radio Frequency Front-End interface.

BACKGROUND

Mobile communication devices may include a variety of components including circuit boards, integrated circuit (IC) devices and/or System-on-Chip (SoC) devices. The components may include processing circuits, user interface components, storage and other peripheral components that communicate through a serial bus. The serial bus may be operated in accordance with a standardized or proprietary protocol. In one example, a two-wire multi-drop serial bus is operated in accordance with an Inter-Integrated Circuit (I2C or I2C) protocol, which was developed to connect low-speed peripherals to a processor. An I2C bus provides a Serial Data Line that carries a data signal, and a Serial Clock Line that carries a clock signal. In another example, the Improved Inter-Integrated Circuit (I3C) protocols defined by the Mobile Industry Processor Interface (MIPI) Alliance derive certain implementation aspects from the I2C protocol including separate clock and data lines. In another example, the Radio Frequency Front-End (RFFE) interface defined by the MIPI Alliance provides a communication interface for controlling various radio frequency (RF) front-end devices, including power amplifiers (PAS), low-noise amplifiers (LNAs), antenna tuners, filters, sensors, power management devices, switches, etc. These devices may be collocated in a single IC device or provided in multiple IC devices. In a mobile communication device, multiple antennas and radio transceivers may support multiple concurrent RF links. In another example, the system power management interface (SPMI) defined by the MIPI Alliance provides a hardware interface that may be implemented between baseband or application processors and peripheral components for purposes that include power management within a device.

Increased functional complexity and an associated increased demand for data throughput has been accompanied by a requirement to maintain the limits on frequency of serial bus clock signals for standards-compliant or compatible usage. There is a continual demand for increased reliability and throughput over serial buses, and increasing demand for methods to increase data throughput without corresponding increases in clock frequencies.

SUMMARY

Certain aspects of the disclosure relate to systems, apparatus, methods and techniques that can improve data throughput for a serial bus without changing the frequency of the clock signals that control transmissions over the serial bus.

In various aspects of the disclosure, a method for transmitting data over a serial bus includes transmitting two bits of data over a first wire of a serial bus in each cycle of a plurality of cycles of a transmitter clock signal, transmitting a synchronization pattern over a second wire of the serial bus in a first cycle in the plurality of cycles of the transmitter clock signal, and transmitting two bits of data over the second wire of the serial bus in each cycle of the plurality of cycles of the transmitter clock signal except for the first cycle in the plurality of cycles of the transmitter clock signal.

In various aspects of the disclosure, a method for receiving data over a serial bus includes receiving two bits of data over a first wire of a serial bus in each of a plurality of cycles of a receiver clock signal, synchronizing the receiver clock signal to a synchronization pattern received over a second wire of the serial bus in a first cycle in the plurality of cycles of the receiver clock signal, and receiving two bits of data over the second wire of the serial bus in each cycle of the plurality of cycles of the receiver clock signal except for the first cycle in the plurality of cycles of the receiver clock signal.

In various aspects of the disclosure, a processor-readable storage medium has code stored thereon that, when executed by a processor, causes a processing circuit to transmit two bits of data over a first wire of a serial bus in each cycle of a plurality of cycles of a transmitter clock signal, transmit a synchronization pattern over a second wire of the serial bus in a first cycle in the plurality of cycles of the transmitter clock signal, and transmit two bits of data over the second wire of the serial bus in each cycle of the plurality of cycles of the transmitter clock signal except for the first cycle in the plurality of cycles of the transmitter clock signal.

In various aspects of the disclosure, a processor-readable storage medium has code stored thereon that, when executed by a processor, causes a processing circuit to receive two bits of data over a first wire of a serial bus in each of a plurality of cycles of a receiver clock signal; synchronize the receiver clock signal to a synchronization pattern received over a second wire of the serial bus in a first cycle in the plurality of cycles of the receiver clock signal; and receive two bits of data over the second wire of the serial bus in each cycle of the plurality of cycles of the receiver clock signal except for the first cycle in the plurality of cycles of the receiver clock signal.

In certain aspects, 16 bits of data and 2 parity bits are transmitted in five cycles of the plurality of cycles of the transmitter clock signal. Two bits of data transmitted over the serial bus in one of the plurality of cycles of the transmitter clock signal include parity information.

In certain aspects, the synchronization pattern may include a transition in signaling state of the second wire between two half cycles of the transmitter clock signal. The synchronization pattern may be transmitted in a first-transmitted cycle or a last-transmitted cycle of the plurality of cycles of the transmitter clock signal.

In certain aspects, a termination pattern is transmitted over the second wire of the serial bus in a subsequent plurality of cycles of the transmitter clock signal. Signaling state of the second wire does not change during transmission of the termination pattern.

DETAILED DESCRIPTION

Figure 1:
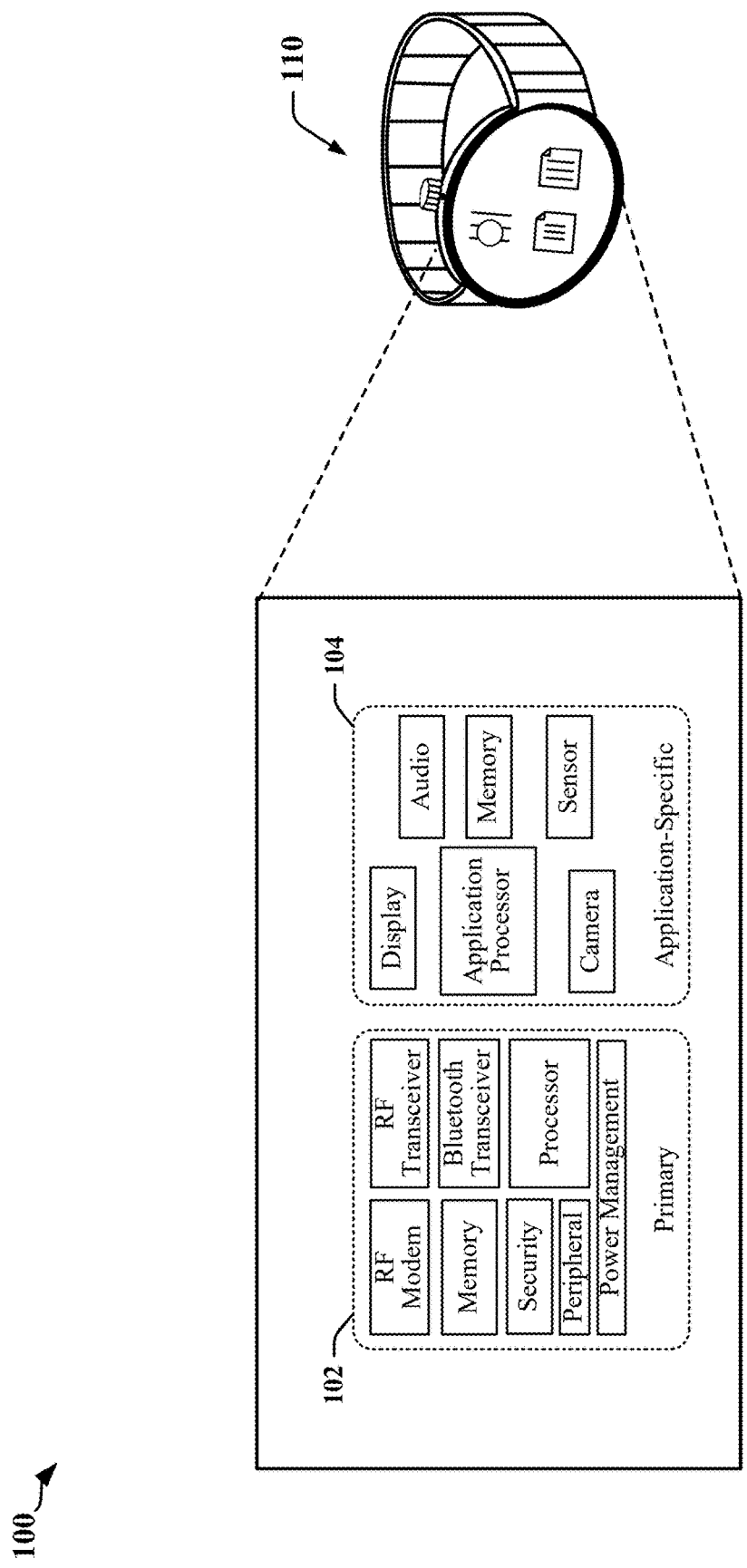
FIG. 1 illustrates an apparatus that interconnects integrated circuit devices using a data communication link that may be operated according to certain aspects of this disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of the invention will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

Certain aspects of the disclosure relate to multidrop serial bus configurations in which multiple devices can communicate at various times. The described serial buses are typically operated in a hierarchical manner, in that one device controls communication during a transaction. The controlling device may be referred to as a host device, a bus master device, a managing device or another term favored by standards defining the protocols implemented by the controlling device. In some serial bus configurations, a single controlling device manages or controls communication during all transactions conducted over the serial bus. In other serial bus configurations, multiple devices can operate as the controlling device and one device serves as the controlling device for each transaction conducted over the serial bus. The controlling device may provide a common clock signal that is transmitted over a conventional two-wire serial bus. The controlling device may provide control signaling that identifies a type of transaction to be conducted over a conventional two-wire serial bus. During certain transactions, a controlling device may transmit commands directed to one or more receiving devices using address information provided in or with the commands. The receiving devices may be referred to as a subordinate device, a client device, a slave device, a peripheral device or another term favored by standards defining the protocols implemented by the controlling device. For the purposes of this disclosure, a controlling device will be referred to as a host device and associated receiving devices will be referred to as subordinate devices.

Overview

Devices that include one or more system on a chip (SoC) devices and/or one or more other integrated circuit (IC) devices often communicate through a shared communication interface. The shared communication interface may couple processors with modems and other peripherals using a serial bus or other data communication link. The serial bus or other data communication link may be operated in accordance with one or more standards or protocols. For example, the serial bus may be operated in accordance with an I2C, I3C, SPMI, and/or RFFE protocol, or another protocol that may be configured for half-duplex operation. Increased functionality and complexity of operations involving devices coupled to serial buses, together with the imposition of more stringent timing constraints in support of applications, peripherals and sensors can result in greater demand on general-purpose input/output (GPIO) pin availability and communication link throughput.

Certain aspects disclosed herein provide protocols that may replace or supplement a serial bus protocol, such as an I2C, I3C, SPMI, and/or RFFE protocol. Certain aspects are applicable to a serial bus operated in half-duplex mode or full-duplex mode. In some implementations, certain aspects disclosed herein may be deployed to support exchange of virtual GPIO (VGI) messages, which can be used to communicate the state or change in state of physical GPIO pins without physical connections between devices. Certain aspects are applicable to multipoint interfaces, point-to-point interfaces, or interfaces switchable between point-to-point and multipoint modes. Certain aspects are applicable to point-to-point interfaces.

Examples of Apparatus that Employ Serial Data Links

According to certain aspects of the disclosure, a serial data link may be used to interconnect electronic devices that are subcomponents of an apparatus such as a cellular phone, a smart phone, a session initiation protocol (SIP) phone, a laptop, a notebook, a netbook, a smartbook, a personal digital assistant (PDA), a satellite radio, a global positioning system (GPS) device, a smart home device, intelligent lighting, a multimedia device, a video device, a digital audio player (e.g., MP3 player), a camera, a game console, an entertainment device, a vehicle component, a wearable computing device (e.g., a smart watch, a health or fitness tracker, eyewear, etc.), an appliance, a sensor, a security device, a vending machine, a smart meter, a drone, a multicopter, or any other similar functioning device.

FIG. 1 illustrates an apparatus 100 that interconnects IC devices using a data communication link that may be operated according to certain aspects of this disclosure. In the illustrated example, certain components or functions are implemented using multiple chiplets that are interconnected using one or more data communication buses. A chiplet may be defined as an integrated circuit that is limited in physical size and that includes circuits and components that support a predefined subset of functionality. Multiple chiplets can be stacked or collocated in a single package. Chiplet technology can be used to address some of the performance, power and size design requirements for complex SoCs used in certain mobile or wearable devices.

In one example, the apparatus 100 may be enclosed within a wearable device, a portable or wearable processing and/or communication device (each of which being referred to herein as a portable communication device or PCD), sensors, instruments, appliances and other such devices include one or more ICs. These devices may include mobile phones, tablet computers, palmtop computers, portable digital assistants (PDAs), portable game consoles, and other portable electronic devices such as the illustrated smartwatch 110. PCDs commonly contain integrated circuits or SoCs that include numerous components or subsystems designed to work together to deliver functionality to a user. The various SoC subsystems may communicate with each other via one or more intra-chip data buses or similar data communication interconnects. PCDs may have multiple SoCs that communicate with each other via similar inter-chip interconnects. The ICs are typically packaged in an IC package, which may be referred to as a "semiconductor package" or "chip package." The IC package typically includes a package substrate and one or more IC chips or other electronic modules mounted to the package substrate to provide electrical connectivity to the IC chips. For example, an IC chip in an IC package may be configured as an SoC. The IC chips are electrically coupled to other IC chips and/or to other components in the IC package through electrical coupling to metal lines in the package substrate. The IC chips can also be electrically coupled to other circuits outside the IC package through electrical connections of external metal interconnects (e.g., solder bumps) of the IC package.

The apparatus 100 may be configured by selecting a combination of chiplets that implement certain subsystems or distinct functional elements. In the illustrated example, the apparatus 100 includes a set of primary chiplets 102 that enable the apparatus 100 to perform core processing, security and communication functions. The set of primary chiplets 102 include a processor, memory and one or more modems. The illustrated apparatus 100 also includes a set of application-specific chiplets 104 that includes an application processor, display driver, camera interface and audio controller. In a remote sensing device or appliance, the audio-visual components could be omitted and may be replaced with analog-to-digital controllers, for example.

The apparatus 100 may include a variety of processing engines, such as central processing units (CPUs) with multiple cores, graphical processing units (GPUs), digital signal processors (DSPs), neural processing units (NPUs), wireless transceiver units (also referred to as modems), peripherals, display and imaging interfaces, etc. Each of these subsystems and other functional elements can be implemented as an individual chiplet, or as a combination of chiplets. The chiplets included in the apparatus 100 can be proprietary or may be acquired from a variety of sources. An SoC may be constructed from chiplets manufactured at different process nodes and/or operated at different voltages.

Figure 2:
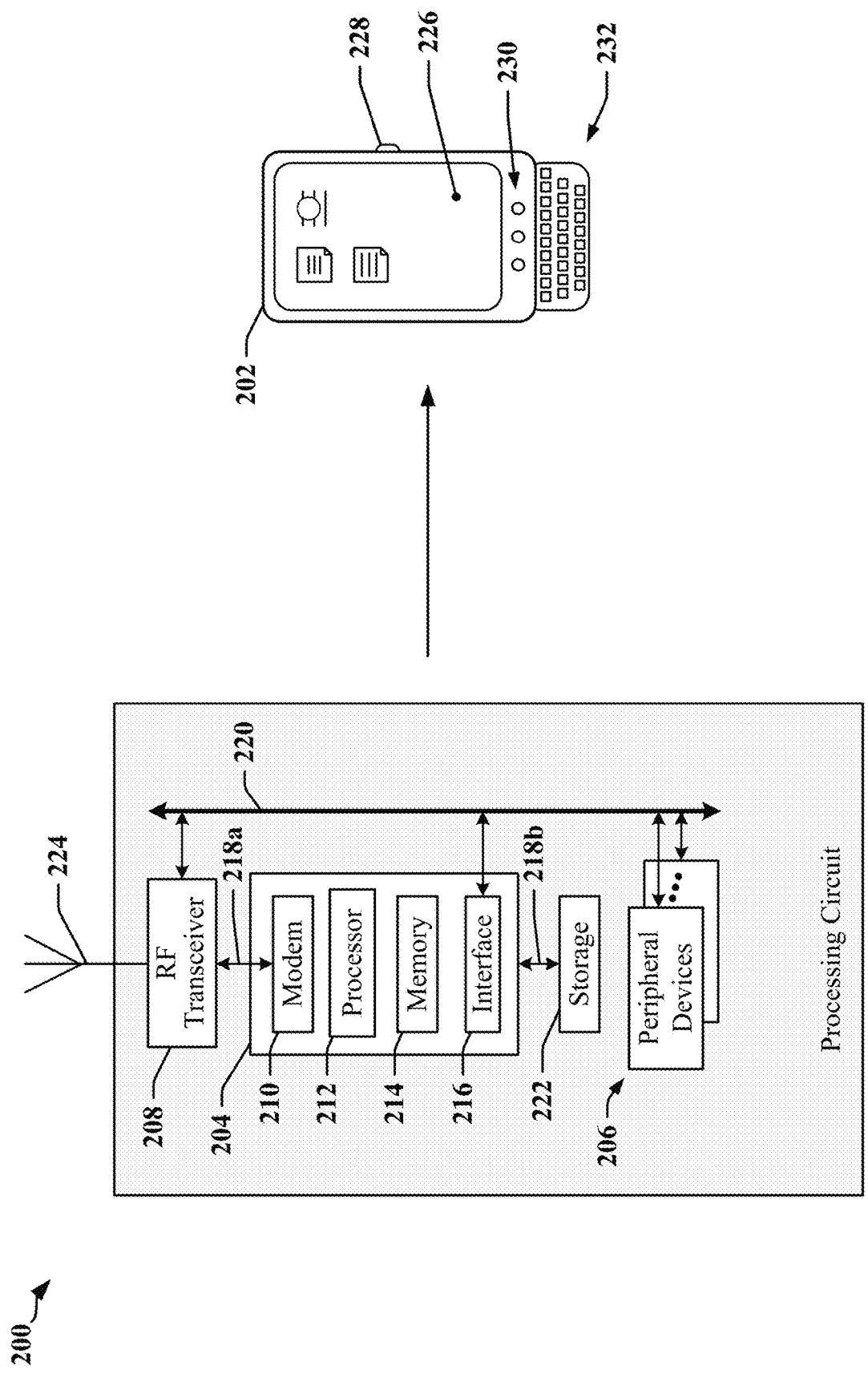
FIG. 2 illustrates a processing circuit that includes or is coupled to a data communication link that may be operated according to certain aspects of this disclosure.

FIG. 2 illustrates a processing circuit 200 that includes or is coupled to a data communication link that may be operated according to certain aspects of this disclosure. The processing circuit 200 may include multiple circuits or devices 204, 206 and/or 208, and may be implemented using one or more IC devices or one or more SoC devices. In one example, the processing circuit 200 may be implemented in a communication device and using a primary device 204, one or more peripheral devices 206, and a transceiver 208 that enables the apparatus to communicate through an antenna 224 with a radio access network, a core access network, the Internet and/or another network.

The primary device 204 may include one or more processors 212, one or more modems 210, on-board memory 214, a bus interface circuit 216 and/or other logic circuits or functions. The processing circuit 200 may be controlled by an operating system that provides an application programming interface (API) layer to enable a processor 212 to execute software modules residing in the on-board memory 214 or other processor-readable storage 222 provided on the processing circuit 200. The software modules may include instructions and data stored in the on-board memory 214 or processor-readable storage 222. The primary device 204 may access its on-board memory 214, the processor-readable storage 222, and/or storage external to the primary device 204 or external to the processing circuit 200. The on-board memory 214, the processor-readable storage 222 may include read-only memory (ROM) or random-access memory (RAM), electrically erasable programmable ROM (EEPROM), flash cards, or any memory device that can be used in processing systems and computing platforms. The processing circuit 200 may include, implement, or have access to a local database or other parameter storage that can maintain operational parameters and other information used to configure and operate the processing circuit 200. The local database may be implemented using registers, a database module, flash memory, magnetic media, EEPROM, soft or hard disk, or the like.

The processing circuit 200 may also be operably coupled to external devices such as the antenna 224, a display 226, operator controls, such as switches or buttons 228, 230 and/or an integrated or external keypad 232 of an associated device 202, among other components. A user interface module may be configured to communicate with the display 226, external keypad 232, etc. through a dedicated communication link or through one or more serial data interconnects.

The processing circuit 200 may provide one or more buses 218a, 218b, 220 that enable certain of the devices 204, 206, and/or 208 to communicate. In one example, the primary device 204 may include a bus interface circuit 216 that includes a combination of circuits, counters, timers, control logic and other configurable circuits or modules. In one example, the bus interface circuit 216 are configured to operate in accordance with some combination of standards-defined and proprietary communication specifications or protocols. The processing circuit 200 may include or control a power management function that configures and manages operations of an apparatus that includes or is coupled to the processing circuit 200.

Figure 3:
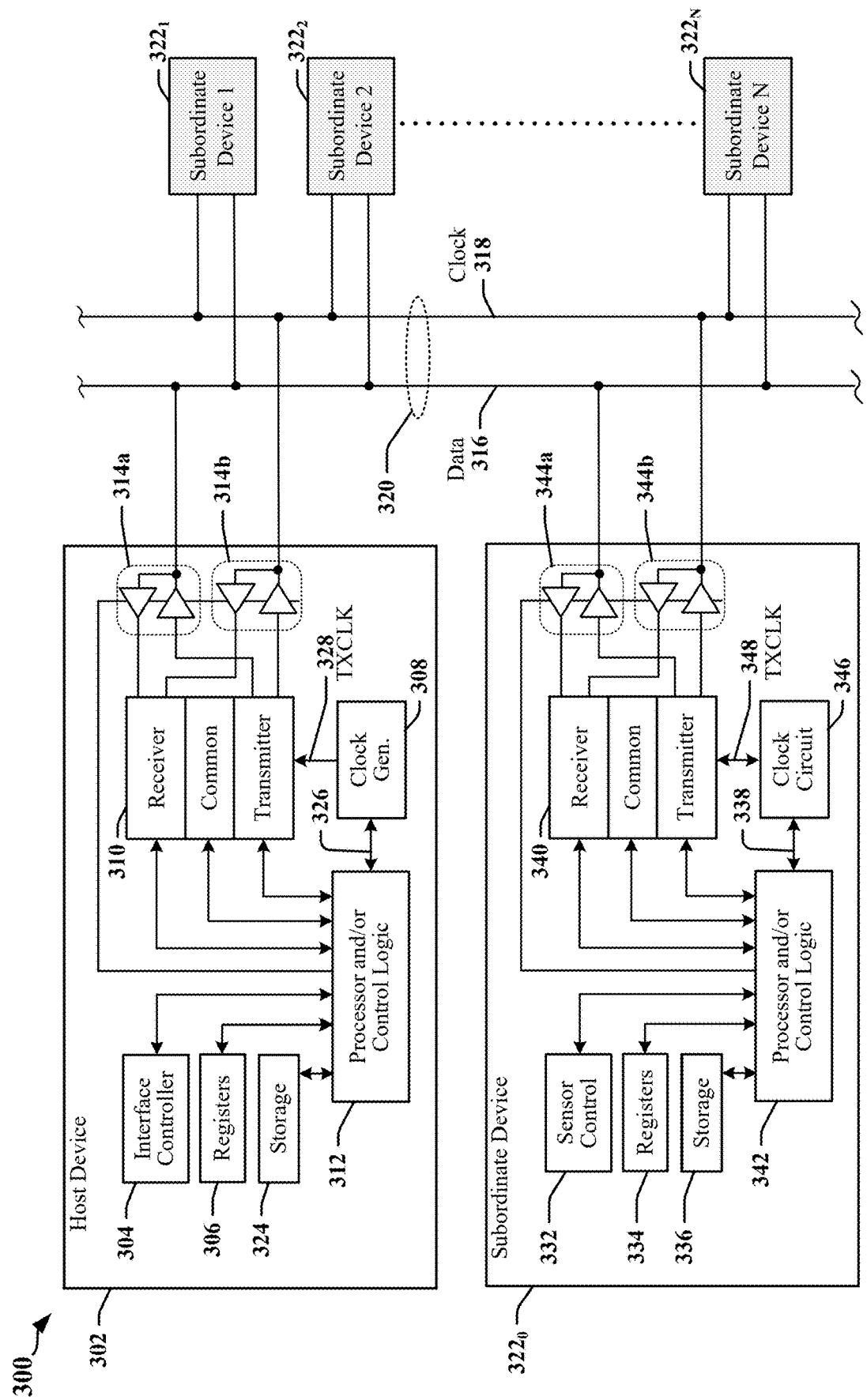
FIG. 3 illustrates a first example of an apparatus that includes or is coupled to a two-wire serial bus that may be operated according to certain aspects of this disclosure.

FIG. 3 illustrates a first example of an apparatus 300 that includes or is coupled to a two-wire serial bus 320 that may be operated according to certain aspects of this disclosure. The two-wire serial bus 320 may be used to communicatively couple two or more devices. In the illustrated example, the two-wire serial bus 320 may be used to communicatively couple multiple devices 302, and $322_0$-$322_N$. Some or all of the devices 302 and $322_0$-$322_N$ may be implemented in different IC devices or chiplets. In various implementations, certain of the devices 302 and $322_0$-$322_N$ may include, support or operate as a modem, a signal processing device, a display driver, a camera, a user interface, a sensor, a sensor controller, a media player, a transceiver, and/or other such components or devices. In some examples, one or more devices $322_0$-$322_N$ may be used to control, manage or monitor a sensor device. Communication between devices 302 and $322_0$-$322_N$ over the serial bus 320 is controlled by a host device 302. Certain types of bus can support multiple host devices 302.

In one example, a host device 302 may include an interface controller 304 that may be configured to manage access to the serial bus, configure dynamic addresses for subordinate devices and/or generate a clock signal 328 to be transmitted on a clock line 318 of the serial bus 320. The host device 302 may include configuration registers 306 or other storage 324, and other control logic 312 configured to handle protocols and/or higher-level functions. The control logic 312 may include a processing circuit such as a state machine, sequencer, signal processor or general-purpose processor. The host device 302 includes a transceiver 310 and line drivers/receivers 314a and 314b. The transceiver 310 may include receiver, transmitter and common circuits, where the common circuits may include timing, logic and storage circuits and/or devices. In one example, the transmitter encodes and transmits data based on timing in the clock signal 328 provided by a clock generation circuit 308. Other timing clocks 326 may be used by the control logic 312 and other functions, circuits or modules.

One or more devices $322_0$-$322_N$ may be configured to operate as a subordinate device. In some examples, a subordinate device may include circuits and modules that support a display, an image sensor, and/or circuits and modules that control and communicate with one or more sensors that measure environmental conditions. In one example, a device $322_0$ configured to operate as a subordinate device may provide a control function, module or circuit 332 that includes circuits and modules to support a display, an image sensor, and/or circuits and modules that control and communicate with one or more sensors that measure environmental conditions. In this example, the device $322_0$ can include configuration registers 334 or other storage 336, control logic 342, a transceiver 340 and line drivers/receivers 344a and 344b. The control logic 342 may include a processing circuit such as a state machine, sequencer, signal processor or general-purpose processor. The transceiver 340 may include receiver, transmitter and common circuits, where the common circuits may include timing, logic and storage circuits and/or devices. In one example, the transmitter encodes and transmits data based on timing in a clock signal 348 provided by clock generation and/or recovery circuits 346. In some instances, the clock signal 348 may be derived from a signal received from the clock line 318. Other timing clocks 338 may be used by the control logic 342 and other functions, circuits or modules.

The serial bus 320 may be operated in accordance with RFFE, I2C, I3C, SPMI, or other protocols. At least one of the devices 302 and $322_0$-$322_N$ may be configured to operate as a host device and a subordinate device on the serial bus 320. Two or more of the devices 302 and $322_0$-$322_N$ may be configured to operate as a host device on the serial bus 320. The protocol selected to control operation of the serial bus 320 may define direct current (DC) characteristics affecting certain signal levels associated with the serial bus 320, and/or alternating current (AC) characteristics affecting certain timing aspects of signals transmitted on the serial bus 320. In various examples, a 3-wire serial bus 320 transmits data on a data line 316 and a clock signal on the clock line 318. In some instances, data may be encoded in the signaling state, or transitions in signaling state of the data line 316 and the clock line 318.

Figure 4:
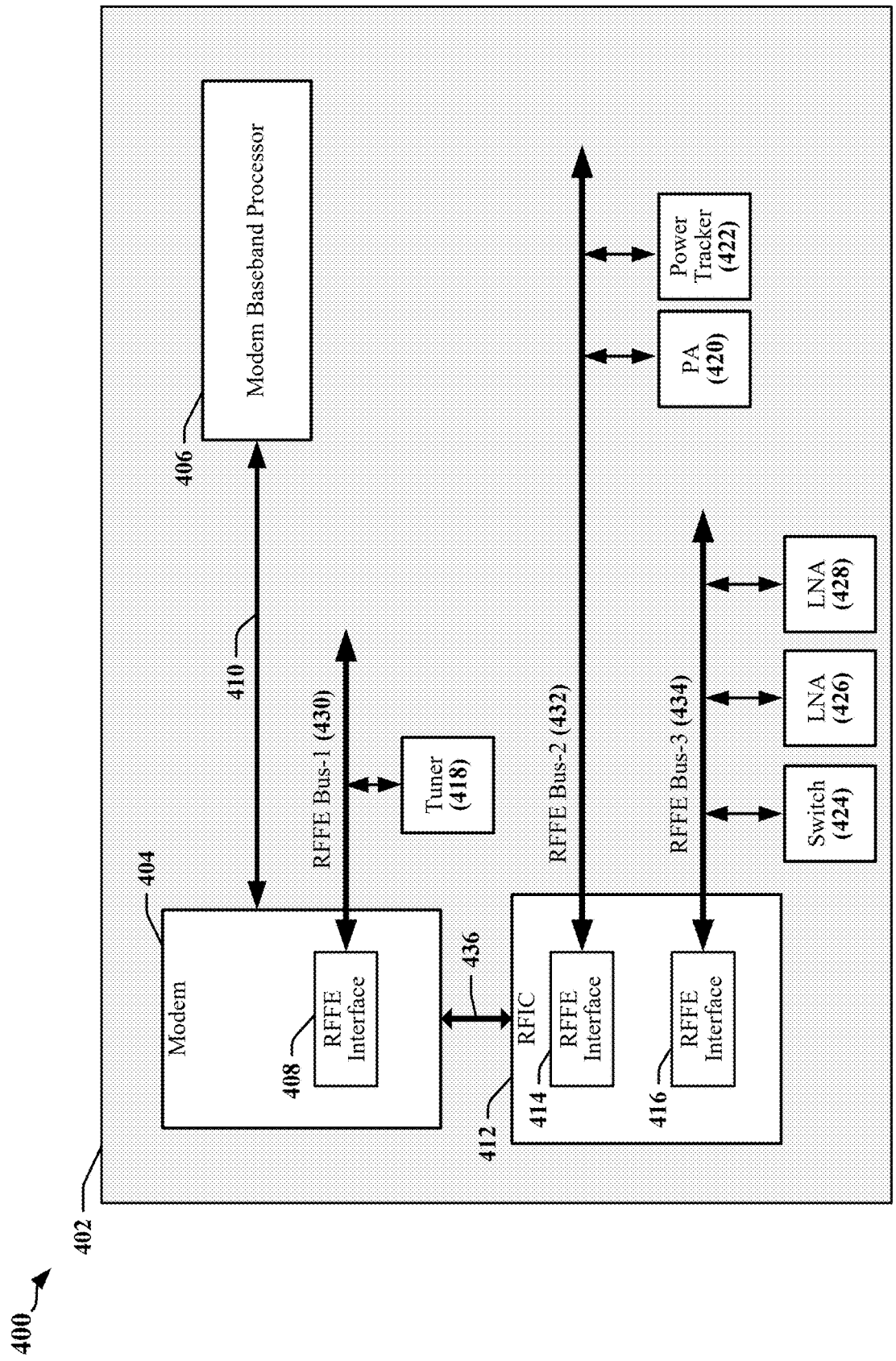
FIG. 4 illustrates a second example of an apparatus that includes or is coupled to a two-wire serial bus that may be operated according to certain aspects of this disclosure.

FIG. 4 illustrates a second example of an apparatus 400 that includes or is coupled to a two-wire serial bus that may be operated according to certain aspects of this disclosure. In this example, a chipset or device 402 employs multiple RFFE buses 430, 432, 434 to couple various RF front-end devices 418, 420, 422, 424, 426, 428. A modem 404 includes an RFFE interface 408 that couples the modem 404 to a first RFFE bus 430. The modem 404 may communicate with a baseband processor 406 and a Radio-Frequency IC (RFIC 412) through one or more communication links 410, 436. The illustrated device 402 may be embodied in one or more of a mobile communication device, a mobile telephone, a mobile computing system, a notebook computer, a tablet computing device, a media player, a gaming device, a wearable computing and/or communication device, an appliance, or the like.

In various examples, the device 402 may be implemented with one or more baseband processors 406, modems 404, RFICs 412, multiple communication links 410, 436, multiple RFFE buses 430, 432, 434 and/or other types of buses. The device 402 may include other processors, circuits, modules and may be configured for various operations and/or different functionalities. In the example illustrated in FIG. 4, the Modem is coupled to an RF tuner 418 through its RFFE interface 408 and the first RFFE bus 430. The RFIC 412 may include one or more RFFE interfaces 414, 416, controllers, state machines and/or processors that configure and control certain aspects of the RF front-end. The RFIC 412 may communicate with a PA 420 and a power tracking module 422 through a first of its RFFE interfaces 414 and a second RFFE bus 432. The RFIC 412 may communicate with a switch 424 and one or more LNAs 426, 428 through a second of its RFFE interfaces 416 and a third RFFE bus 434.

Bus latency can affect the ability of a serial bus to handle high-priority, real-time and/or other time-constrained messages. Low-latency messages, or messages requiring low bus latency, may relate to sensor status, device-generated real-time events and virtualized GPIO state. In one example, bus latency may be measured as the time elapsed between a message becoming available for transmission and the delivery of the message or, in some instances, commencement of transmission of the message. Other measures of bus latency may be employed. Bus latency typically includes delays incurred while higher priority messages are transmitted, interrupt processing, the time required to terminate a datagram in process on the serial bus, the time to transmit commands causing bus turnaround between transmit mode and receive mode, bus arbitration and/or command transmissions specified by protocol.

In certain examples, latency-sensitive messages may include coexistence messages. Coexistence messages are transmitted in a multisystem platform to prevent or reduce instances of certain device types impinging on each other, including for example, switches 424, LNAs 426, 428, PAs 420 and other types of devices that operate concurrently in a manner that can generate inter-device interference, or that could potentially cause damage to one or more devices. Devices that may interfere with one another may exchange coexistence management (CxM) messages to permit each device to signal imminent actions that may result in interference or conflict. CxM messages may be used to manage operation of shared components including a switch 424, LNA 426, 428, PA 420 and/or an antenna.

Multi-drop interfaces such as RFFE, SPMI, I3C, etc. can reduce the number of physical input/output (I/O) pins used to communicate between multiple devices. Protocols that support communication over a multi-drop serial bus define a datagram structure used to transmit command, control and data payloads. Datagram structures for different protocols define certain common features, including addressing used to select devices to receive or transmit data, clock generation and management, interrupt processing and device priorities. In this disclosure, the example of RFFE protocols may be employed to illustrate certain aspects disclosed herein. However, the concepts disclosed herein are applicable to other serial bus protocols and standards.

Figure 5:
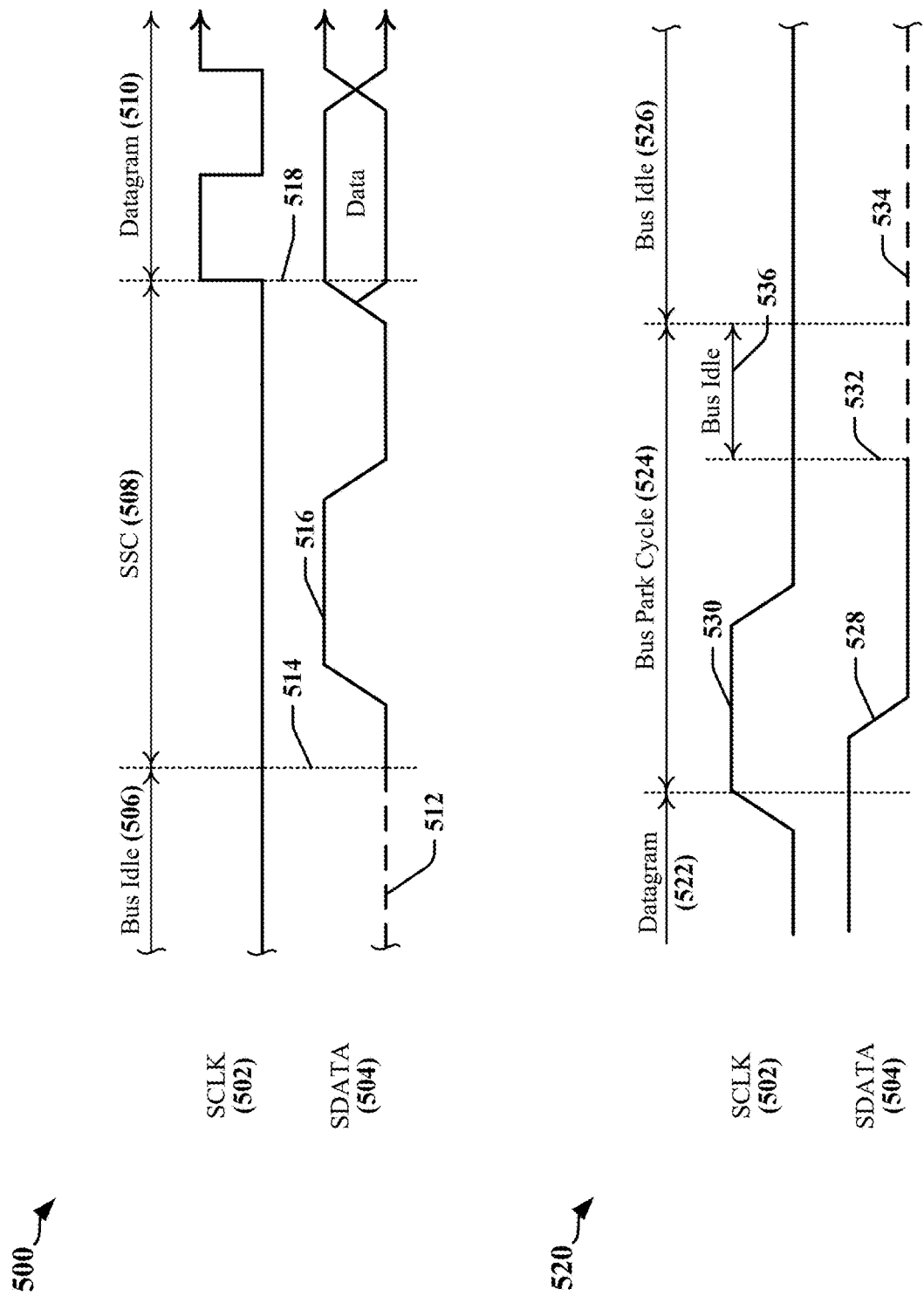
FIG. 5 includes timing diagrams that illustrate signaling transmitted to delineate the boundaries of RFFE and SPMI datagrams.

FIG. 5 includes timing diagrams 500, 520 that illustrate signaling that is transmitted to delineate the boundaries of datagrams transmitted in accordance with RFFE protocols. The timing diagrams 500, 520 show the relative timing of signals transmitted on a 2-wire serial bus that provides a clock signal on SCLK 502 and provides for exchange of data over SDATA 504. The first timing diagram 500 illustrates timing of a sequence start condition (SSC 508) that is transmitted to signal the start of a transaction such as the transmission of a datagram 510. The SSC 508 is transmitted when the serial bus is in an idle state 506. In the idle state 506, SCLK 502 is driven at full strength by a host device while subordinate devices coupled to the serial bus present a high impedance to SCLK 502. SCLK 502 is held in the low signaling state (here, at zero volts) by the host device. In the idle state 506, SDATA 504 is weakly driven by the host device or is held in the weakly driven low signaling state 512 using a keeper circuit or a weak pull-down circuit. A keeper circuit or a weak pull-down circuit may maintain the signaling state of SDATA 504, for example, when the host device has caused its line driver to enter a high impedance state and when no other device is driving SDATA 504. The weakly driven low signaling state 512 can easily be overcome by another line driver that can drive SDATA 504 at full strength.

In a master-driven SSC 508, the host device commences transmission of the SSC 508 at a first point in time 514 when it begins to drive SDATA 504 at full strength, initially at the low signaling state. The host device then provides a pulse 516 on SDATA 504 while continuing to drive SCLK 502 to the low signaling state. The pulse 516 has duration of at least one cycle of a clock signal provided on SCLK 502 during transmission of a datagram 510. At a second point in time 518, the host device commences transmission of clock pulses on SCLK 502, thereby providing the clock signal used to control or indicate timing of a datagram 510 transmitted on SDATA 504.

The second timing diagram 520 illustrates timing of a bus park cycle (the BPC 524) that may be transmitted to signal the termination of a datagram 522, for example. The BPC 524 is transmitted by providing a falling edge 528 on SDATA 504 while SCLK 502 is in a high signaling state 530. By protocol, transitions on SDATA 504 during transmission of the datagram 522 are permitted only while the clock signal is in the low signaling state, and the falling edge 528 that occurs while SCLK 502 is in the high signaling state 530 is interpreted as control signaling (i.e., the BPC 524). The falling edge 528 is provided by the host device driving SDATA 504 low at full strength. The host device then drives SCLK 502 low and continues to drive SCLK 502 at full strength through subsequent bus idle intervals 526, 536. After driving SCLK 502 low, the host device initiates a bus idle interval 536 at a time 532 when the host device causes its line driver to enter the high impedance state. While no other device is driving SDATA 504, SDATA 504 remains in the weakly driven low signaling state 534. The BPC 524 is terminated and the serial bus enters a bus idle interval 526 until the next datagram is ready for transmission.

Figure 6:
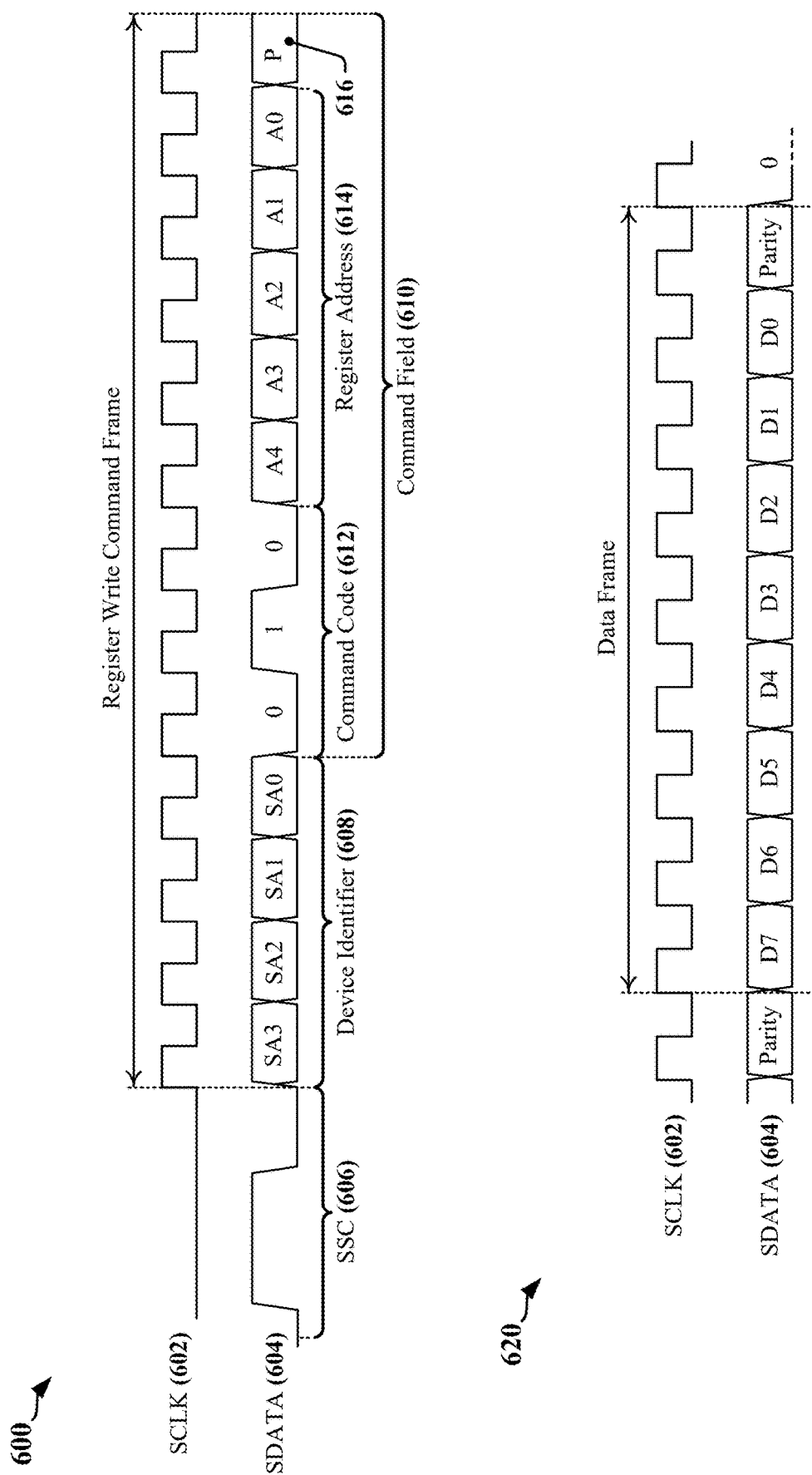
FIG. 6 illustrates datagram structures defined by RFFE protocols that may be adapted in accordance with certain aspects disclosed herein.

FIG. 6 illustrates datagram structures for a Register Write command transmitted over SCLK 602 and SDATA 604 of a serial bus that is operated in accordance with RFFE protocols. The Register Write (RW) command may be used by a controlling device to efficiently write data to registers within an addressable register address range of a subordinate device. The illustrated RW command includes a Register Write command frame 600 and a Register Write data frame 620. Register Write command frame 600 is preceded in transmission by a two-bit sequence start condition (the SSC 606) followed by a four-bit device identifier ID 608. The device identifier 608 may be configured with a unique device address, group identifier or a broadcast address. In some implementations, one of the 16 addresses may be reserved for use as a broadcast address. A nine-bit command field 610 is transmitted next. The illustrated nine-bit command field 610 includes a three-bit command code 612, a five-bit address field 614 and a parity bit 616. The Register Write data frame 620 carries a single data byte. Bus park signaling may be provided to terminate the Register Write command.

Demands for increased data transmission rates result as radio frequency bandwidths increase, the number of different transmitters and receivers in a mobile communication device increase, and as processing technologies advance to meet these demands. Serial interfaces may be limited by specifications that limit the frequency of bus clock signals used to control data transmissions over the serial bus. For example, certain RFFE specifications promulgated by the MIPI Alliance limit bus clock frequency to 52 MHZ. Furthermore, legacy devices may be unable to communicate using higher bus clock frequencies.

Data transmission rates can be increased without increasing bus clock frequency through the use of double data rate (DDR) bus encoding. Single data rate (SDR) bus encoding permits the transmission of one bit of data for each clock cycle, whereas DDR bus encoding enables one bit of data to be transmitted for each half-cycle of the transmission clock signal. Ternary encoding can be used to encode multiple bits of data in a symbol transmitted in a single clock cycle. In some instances, a combination of DDR bus encoding and ternary encoding can be used to increase data transmission rates.

Figure 7:
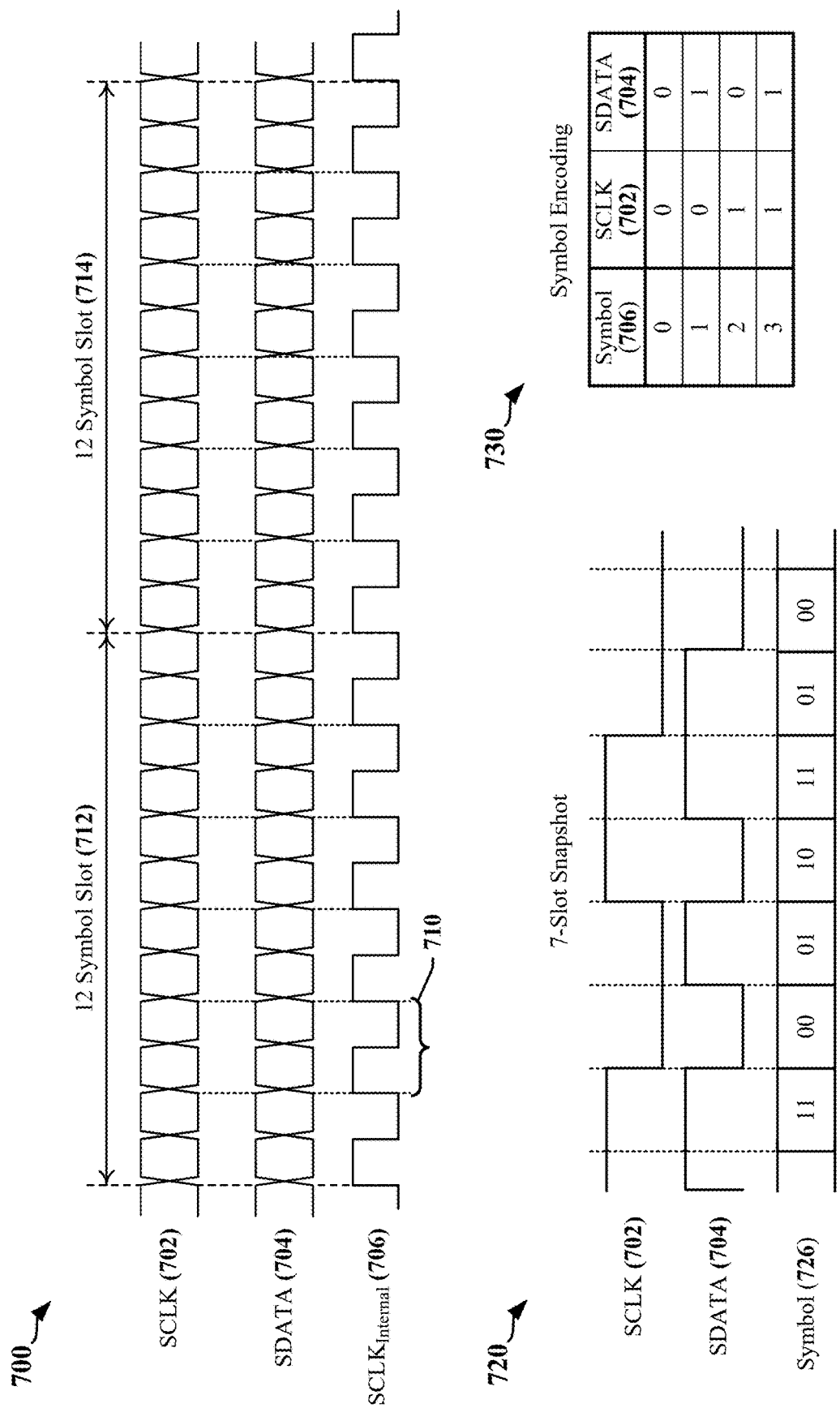
FIG. 7 illustrates the transcoding of data for transmission over a two-wire serial bus.

FIG. 7 includes a first timing diagram 700 that illustrates the encoding of data in symbols that are transmitted on a pair of connectors, wires, lines and/or interconnects comprising a two-wire serial bus. In the illustrated example, data may be transcoded from binary (base-2) numbers to ternary (base-3) numbers. For the purposes of this disclosure, transcoding may be defined as the conversion between two numeral systems; here the numeral systems are binary and ternary systems.

Ternary numbers can be used to encode data for transmission over a two-wire serial bus without transmitting a clock signal over the two-wire serial bus. The transcoded ternary numbers can be used as transition numbers that select the next signaling state of the two-wire serial bus. The signaling state of the two-wire serial bus may be determined by the voltage levels of the two wires (here SCLK 702 and SDATA 704) or by the direction of current through SCLK 702 and SDATA 704. In the illustrated example, a "binary 1" value represents a more positive voltage level on a wire of the serial bus, while a "binary 0" can represent a more negative voltage level. The binary values can be combined to provide a symbol 726 that represent the signaling state of the wire. As illustrated in the table 730 provided in FIG. 7, a set of four possible symbols is provided: {00, 01, 10, 11}.

A single-digit ternary number can represent one of three values expressed here as the base 10 numbers '0', '1' and '2'. A ternary number, when used as a transition number, can select only three of the four possible symbols and corresponding signaling states. Ternary transition numbers may be used to select the next signaling state of the serial bus based on the current signaling state of the serial bus.

Figure 8:
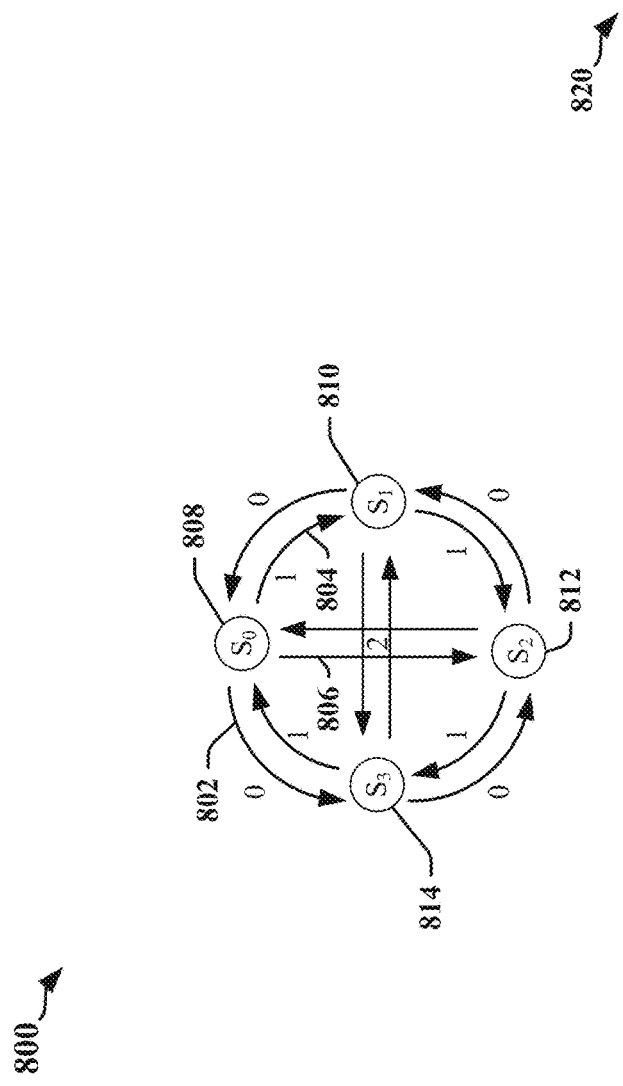
FIG. 8 illustrates an example of an encoding scheme that uses ternary transition numbers.

FIG. 8 illustrates an example of an encoding scheme 800 that uses ternary transition numbers. A single-digit ternary number can represent one of three values that may be represented as {'0', '1', '2'}. A ternary number, when used as a transition number, can select only three of the four binary signaling states available for a two-wire serial bus. In the illustrated example, the ternary transition number cannot select the current signaling state as the next signaling state. Accordingly, the signaling state of at least one wire of the two-wire serial bus changes at the boundary between consecutive symbol transmission intervals 710. The table 820 shows each possible value of a ternary transition number 824 and the transitions 822 represented by the ternary transition numbers 824. Each possible transition from a signaling state 808, 810, 812, 814 is represented on the circle 800, with each transition being labeled with a ternary number. For example, a counterclockwise transition 802 from state $S_0$ 808 may be represented as a ternary number that has a value T=0. A clockwise transition 804 from state $S_0$ 808 may be represented as a ternary value T=1, and a transition 806 from state $S_0$ 808 across the circle (i.e., 2 steps clockwise or counterclockwise) may be represented as a ternary value T=2.

With continued reference to FIG. 7, clock information is provided in the transitions between consecutive symbol transmission intervals 710. The signaling state of the serial bus changes between every consecutive pair of symbol transmission intervals 710. That is, the serial bus is not permitted to remain in the same signaling state for consecutive symbol transmission intervals 710 such that at least one wire transitions between signaling states at the boundary between consecutive symbol transmission intervals 710. These transitions can be used to generate or synchronize edges in an internal clock signal 706 at the receiver.

Transcoding from binary numbers to ternary numbers permits 16 bits of binary data and two parity bits to be encoded in 12 ternary numbers that control 12 signaling state transitions, providing an increase in throughput without altering the clock rate of the serial bus. The 18 bits of binary data and parity define a total of $2^{18}$=262,144 possible values that can be encoded in a 12-bit ternary number that can define $3^{12}$=531,441 values.

The first timing diagram 700 illustrates the transmission of 32 bits of binary data using two 12-symbol slots 712, 714 to carry symbols selected by encoding the 32 bits of binary data in ternary transition numbers. A second timing diagram 720 provides a snapshot of the signaling state of a serial bus when transmitting a sequence of symbols 726 selected by the ternary transition numbers. All four possible signaling states for the two-wire serial bus are included for reference. In the illustrated example, both the data lane (SDATA 704) and the designated or nominal clock lane (SCLK 702) are used to encode data. The table 730 shows one example of a ternary encoding scheme.

Certain aspects of this disclosure provide an encoding scheme that can exceed data transmission rates provided by ternary encoding in SDR and DDR bus encoding modes. In one example, data transmission rates can be increased by at least 16.67% over ternary encoding schemes when an interface is configured in accordance with certain aspects of the disclosure. An asynchronous, dual data lane, double data rate (ADL-DDR) encoding technique provided according to certain aspects of this disclosure can transmit 18 bits of binary data using 5 clock cycles of the bus clock signal used to control data transmissions over the serial bus. In one aspect, bus signaling includes periodic, fixed interval-based clock synchronization transmissions that can be used by the receiver side to correct, accommodate and prevent clock overrun and/or underrun conditions caused by small variations in the clock signals used by the transmitter and receiver. Clock synchronization can be performed concurrently with data capture and decoding from the serial bus.

Figure 9:
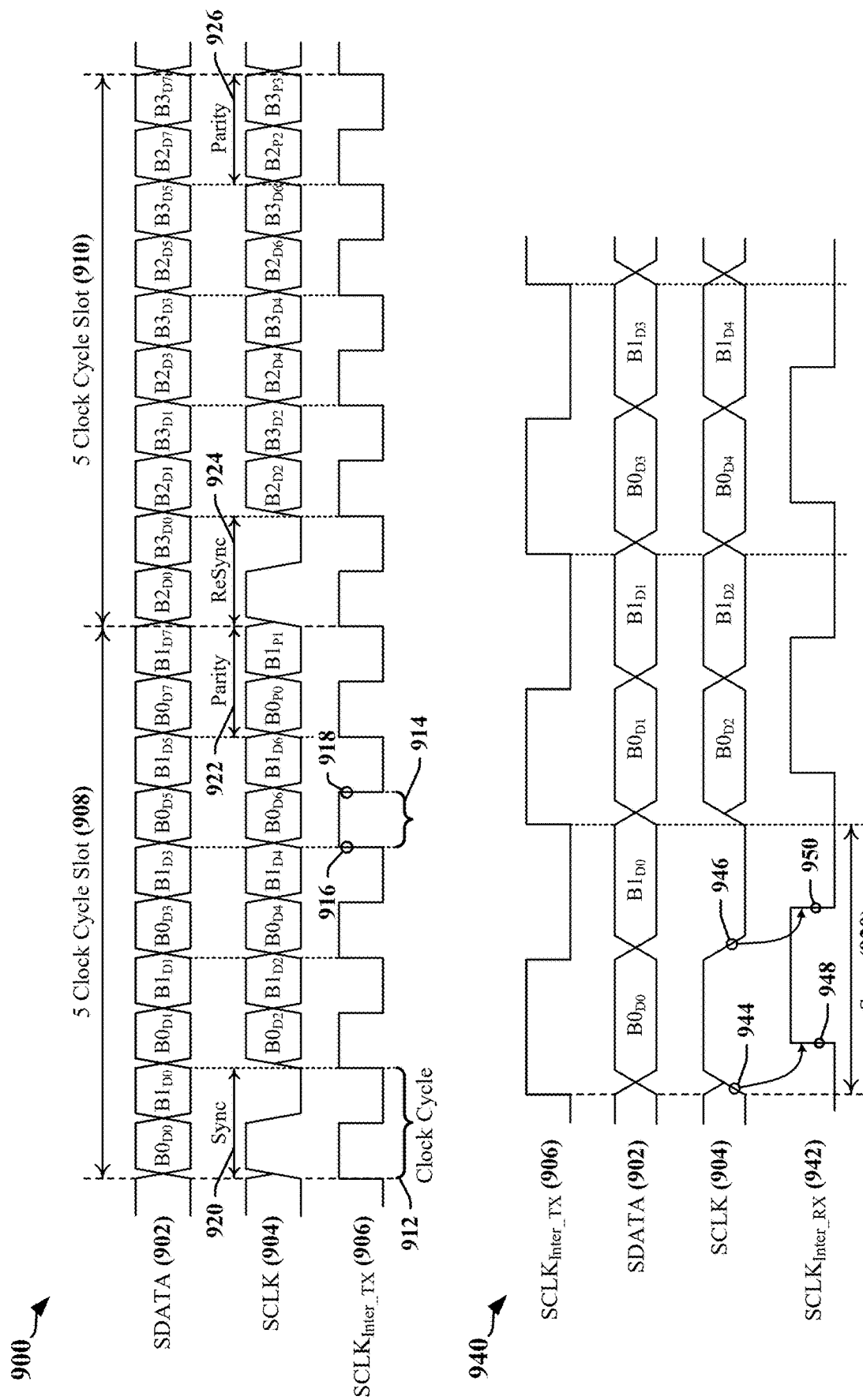
FIG. 9 illustrates asynchronous, dual data lane, double data rate transmission over a two-wire serial bus in accordance with certain aspects of this disclosure.

FIG. 9 illustrates certain aspects of a data transmission over a two-wire serial bus in accordance with certain aspects of this disclosure. An ADL-DDR encoding technique is used to transmit 16-bit binary data with two parity bits in five clock cycles of the bus clock signal used to control data transmissions over the serial bus. The use of ADL_DDR encoding enables two bits to be transmitted in each clock cycle on each wire of the two-wire serial bus. According to one aspect of this disclosure, sixteen bits of data, two bits of parity information and a two-bit synchronization pattern can be transmitted over the two-wire serial bus in the 20 available bits for every five clock cycles.

The first timing diagram 900 illustrates the transmission of binary data in two slots 908, 910, where each slot 908, 910 has a duration of five bus clock cycles. In the illustrated example, each slot 908, 910 carries 16 bits of binary data and two parity bits. A bit transmission interval 914 has a duration that is half the duration of a clock cycle 912. The bit transmission interval 914 may be defined as the interval that lies between two edges 916, 918 of an internal bus clock signal 906 that is used in a transmitter to control data transmissions over the serial bus. The bit transmission interval 914 may also be defined as the interval that lies between two edges 916, 918 of an internal bus clock signal 942 that is used in a receiver to capture data bits from the serial bus.

In the illustrated example, the 16 data bits are transmitted over SDATA 902 and SCLK 904. In each clock cycle, two data bits are transmitted over SDATA 902. Two data bits are transmitted over SCLK 904 in three of the five clock cycles in each slot 908, 910, and the parity bits are transmitted over SCLK 904 in the last clock cycle 922, 926 of each slot 908, 910. The first clock cycle 920, 924 of each slot 908, 910 is reserved for transmitting a synchronization pattern. In the illustrated example, the first bit transmission interval in the first clock cycle 920, 924 of each slot 908, 910 is set to a signaling state corresponding to a binary value of '1' and the second bit transmission interval in the first clock cycle 920, 924 of each slot 908, 910 is set to a signaling state corresponding to a binary value of '0' and a transition (the edge 946) in signaling state occurs at the boundary between the first and second bit transmission intervals. In other implementations, other patterns may be employed.

In the illustrated example, the synchronization pattern is transmitted over SCLK 904 at the beginning of the slots 908, 910. In some implementations, the synchronization pattern in an ADL-DDR transaction may be transmitted over SDATA 902. In some implementations, the synchronization pattern may be transmitted at the end of the slots 908, 910 or in the interior of the of the slots 908, 910. Similarly, the sequence in which data bits are transmitted can be defined by protocol, standards or according to application needs. In the illustrated example, the data bits are interleaved among the transmission intervals and between SDATA 902 and SCLK 904. In other implementations, a first 8-bit byte of data and a first parity bit may be transmitted using the first available 9 transmission intervals and a second 8-bit byte of data and a second parity bit may be transmitted using the next available 9 transmission intervals.

The receiver expects to receive and detect the synchronization pattern in the first clock cycle 920, 924 of each slot 908, 910. As shown in more detail in the second timing diagram 940, the receiver may use one or more edges 944, 946 in the synchronization pattern to align edges 948, 950 in the internal bus clock signal 942 that is used to capture data bits from the serial bus. The receiver may delay the edges 948, 950 to respect setup and hold times defined for sampling data from the serial bus.

The synchronization pattern transmitted in the first clock cycle 920 of the first transmitted slot 908 may be used to obtain an initial synchronization of the internal bus clock signal 906 that is used in a transmitter to control data transmissions over the serial bus and the internal bus clock signal 942 that is used in a receiver to capture data bits from the serial bus. Synchronization patterns transmitted in the first clock cycle 920, 924 of subsequent slots 910 may operate to resynchronize the internal bus clock signals 906, 942. In certain implementations, synchronization is performed using the falling edge 946 in the synchronization pattern. In these implementations, the receiver may perform resynchronization after counting five rising edges in its internal bus clock signal 942 and then detects a falling edge in SCLK 904.

Figure 10:
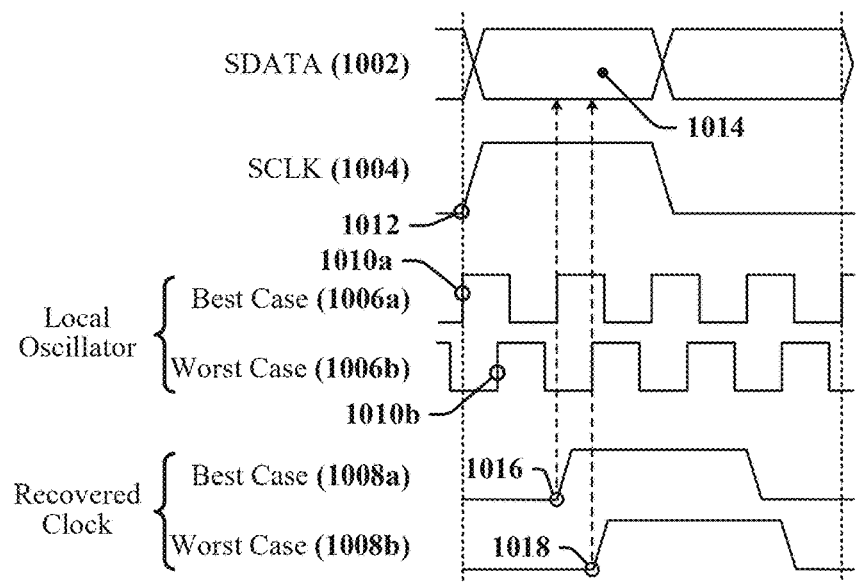
FIG. 10 illustrates clock synchronization at a receiver configured in accordance with certain aspects of this disclosure.
Figure 10:
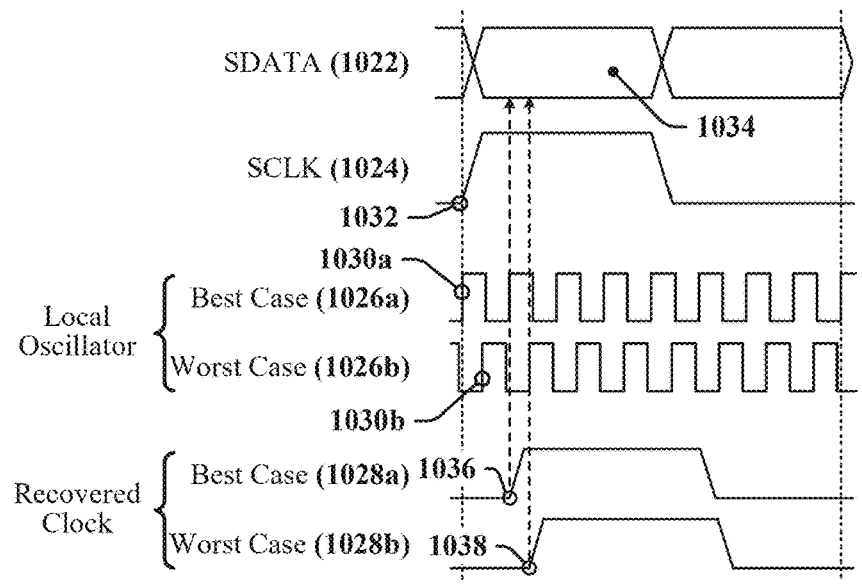

FIG. 10 illustrates examples of timing related to clock synchronization at a receiver configured in accordance with certain aspects of this disclosure. The internal bus clock signal (see the internal bus clock signal 942 in FIG. 9, for example) may be generated using one or more clock signals provided by a local oscillator circuit. In one example, the local oscillator may be implemented using a phase locked loop and may be used to synchronize edges in its recovered clock signal to edges in the synchronization pattern received over SCLK.

The first timing diagram 1000 relates to a local oscillator circuit that produces a base clock signal with a frequency that is four times the frequency of the clock signal used to control data transmissions over the serial bus. In the illustrated example, a best-case base clock signal 1006*a* has a rising edge 1010*a* that is coincident with, or slightly after the rising edge 1012 in a synchronization pattern received over SCLK 1004. A clock recovery circuit in the receiver may sample the synchronization pattern using the rising edge 1010*a* in its clock signal 1006*a* and may generate a rising edge 1016 in its recovered clock signal 1008*a* that is aligned with the next rising edge in the base clock signal 1006*a*. The time available to sample a data bit 1014 received over SDATA 1002 may be maximized when the rising edge 1010*a* in the base clock signal 1006*a* enables the rising edge 1012 in the synchronization pattern to be detected quickly. Moreover, the reliability of sampling of the remaining data bits in the current 5 clock cycle slot can be improved when the rising edge 1010*a* in the base clock signal 1006*a* and rising edge 1012 in the synchronization pattern are closely aligned.

A worst-case base clock signal 1006*b* has a rising edge 1010*b* that is 180° or more out of phase with the rising edge 1012 in the synchronization pattern. The clock recovery circuit in the receiver may sample the synchronization pattern using the next rising edge 1010*b* in its clock signal 1006*b* and may generate a rising edge 1018 in its recovered clock signal 1008*b* that is aligned with a second rising edge in the base clock signal 1006*b*. The time available to sample a data bit 1014 received over SDATA 1002 may be impacted when delays in the rising edge 1010*b* in the base clock signal 1006*b* prevents the rising edge 1012 in the synchronization pattern from being detected quickly. The reliability of sampling of the remaining data bits in the current 5 clock cycle slot can be degraded when the rising edge 1010*a* in the base clock signal 1006*a* and rising edge 1012 in the synchronization pattern are not closely aligned.

The second timing diagram 1020 relates to a local oscillator circuit that produces a base clock signal with a frequency that is eight times the frequency of the clock signal used to control data transmissions over the serial bus. The increased frequency of the base clock signal can improve timing margins for sampling data in the event of a worst-case base clock signal 1026*b*. In the illustrated example, a best-case base clock signal 1026*a* has a rising edge 1030*a* that is coincident with, or slightly after the rising edge 1032 in a synchronization pattern received over SCLK 1024. A clock recovery circuit in the receiver may sample the synchronization pattern using the rising edge 1030*a* in its base clock signal 1026*a* and may generate a rising edge 1036 in its recovered clock signal 1028*a* that is aligned with the next rising edge in the base clock signal 1026*a*. The time available to sample a data bit 1034 received over SDATA 1022 may be maximized when the rising edge 1030*a* in the base clock signal 1026*a* enables the rising edge 1032 in the synchronization pattern to be detected quickly. Moreover, the reliability of sampling of the remaining data bits in the current 5 clock cycle slot can be improved when the rising edge 1030*a* in the base clock signal 1026*a* and rising edge 1032 in the synchronization pattern are closely aligned.

A worst-case base clock signal 1026*b* has a rising edge 1030*b* that is 180° or more out of phase with the rising edge 1032 in the synchronization pattern. The clock recovery circuit in the receiver may sample the synchronization pattern using the next rising edge 1030*b* in its base clock signal 1026*b* and may generate a rising edge 1038 in its recovered clock signal 1028*b* that is aligned with a second rising edge in the base clock signal 1026*b*. The time available to sample a data bit 1034 received over SDATA 1022 may be impacted when delays in the rising edge 1030*b* in the base clock signal 1026*b* prevents the rising edge 1032 in the synchronization pattern from being detected quickly. The reliability of sampling of the remaining data bits in the current 5 clock cycle slot can be degraded when the rising edge 1030*a* in the base clock signal 1026*a* and rising edge 1032 in the synchronization pattern are not closely aligned.

Figure 11:
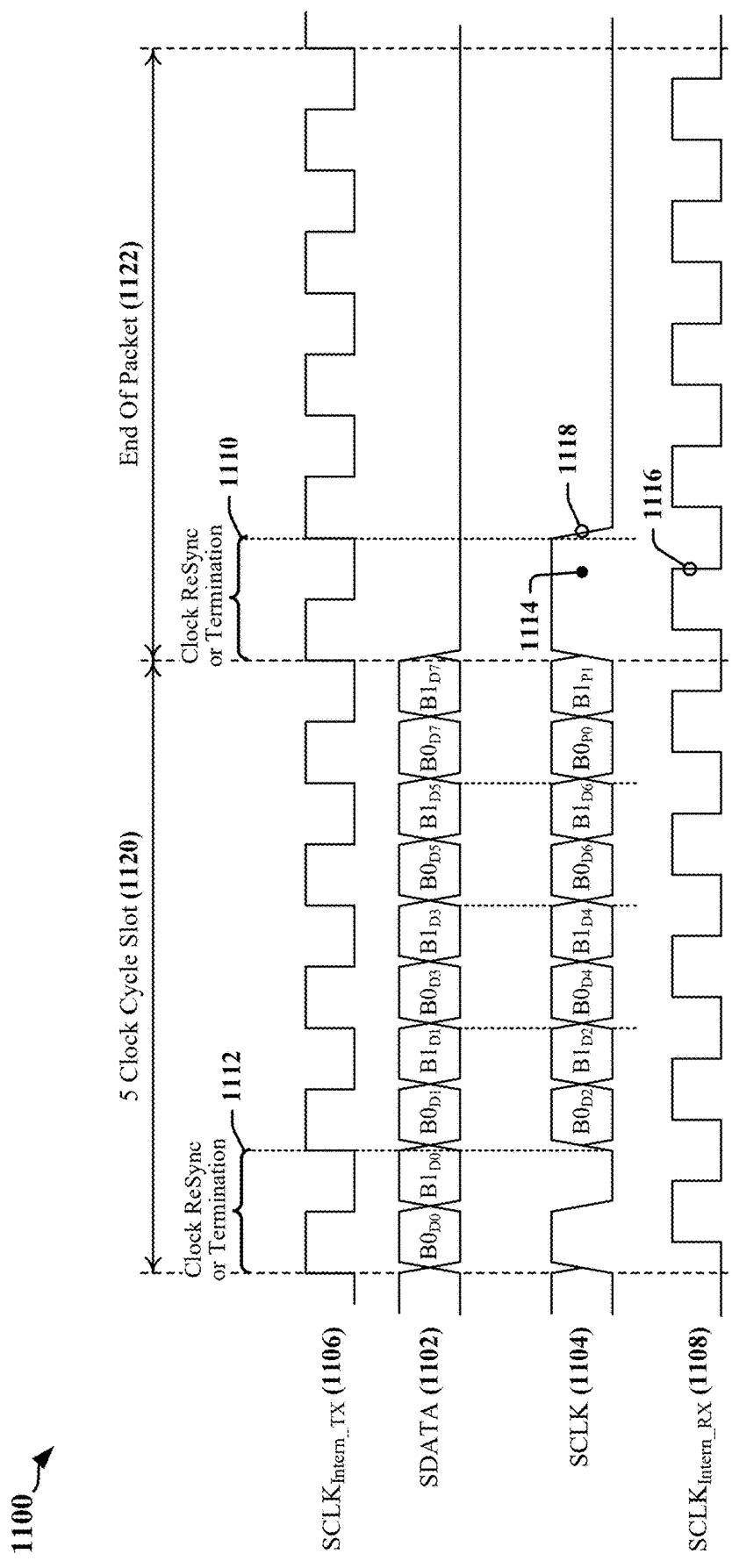
FIG. 11 illustrates termination of a data transmission over a two-wire serial bus in accordance with certain aspects of this disclosure.

FIG. 11 illustrates certain aspects related to the termination of a data transmission over a two-wire serial bus in accordance with certain aspects of this disclosure. The timing diagram 1100 illustrates the transmission of binary data in a slot 1120 that has a duration of five clock cycles of an internal transmitter clock signal 1106. The transmitter clock signal 1106 may be used to control data transmissions over the serial bus. An ADL-DDR encoding technique is used to transmit 16-bit binary data with two parity bits using five clock cycles of the internal transmitter clock signal 1106. A termination pattern 1114 is transmitted over SCLK 1104 in the first bus clock cycle 1110 of an end-of packet slot 1122. The termination pattern 1114 replaces the synchronization pattern expected by the receiver. The termination pattern 1114 commences in the same manner as a synchronization pattern. A synchronization pattern transmitted in the first bus clock cycle 1110 of a slot would operate to synchronize or resynchronize the internal bus clock signal 1108. A synchronization pattern drives SCLK 1104 high for a first bit transmission interval and then drives SCLK 1104 low for a second bit transmission interval. The receiver initiates resynchronization of its internal bus clock signal 1108 after counting five rising edges in its internal bus clock signal 1108 and then detecting the falling edge in SCLK 1104 between the first bit transmission interval and the second bit transmission interval.

The termination pattern 1114 may be provided in an end-of packet slot 1122. In some implementations the end-of packet slot 1122 includes 5 clock cycles. In some implementations the first bus clock cycle 1110 in the end-of packet slot 1122 may be truncated such that it persists for less than 5 clock cycles. In some implementations the end-of packet slot 1122 may be prolonged such that it extends beyond 5 clock cycles.

SCLK 1104 does not transition between the first bit transmission interval and the second bit transmission interval when the termination pattern 1114 is transmitted. In the illustrated example, the termination pattern 1114 ends when SCLK 1104 transitions low at the end of the first bus clock cycle 1110. The termination pattern 1114 could extend beyond one bus clock cycle in duration at the risk of being misinterpreted as an SSC by a device that is not a party to the ADL-DDR transaction.

The receiver may be configured to detect the termination pattern 1114 based on the timing of edges in its internal bus clock signal 1108 and edges in the signal transmitted over SCLK 1104. In one example, the receiver may determine that a resynchronization bus cycle 1110 has commenced or is imminent after counting five rising edges in its internal bus clock signal 1108 after a previous synchronization or resynchronization bus cycle 1112. The receiver may then determine whether the falling edge 1118 in SCLK 1104 occurs before a falling edge 1116 that occurs in its internal bus clock signal 1108. The falling edge 1118 in SCLK 1104 occurs before the falling edge 1116 in the internal bus clock signal 1108 when a synchronization pattern is transmitted. The falling edge 1118 in SCLK 1104 occurs after the falling edge 1116 in the internal bus clock signal 1108 when the termination pattern 1114 is transmitted. SDATA 1102 may be actively driven or may be released and held by a weak keeper circuit, a pullup circuit or pulldown circuit during the end-of packet slot 1122.

In some implementations, the end-of packet slot 1122 is followed by transmission of bus park signaling and/or an SSC to quiesce or reset the serial bus before a next transaction. In some implementations, the controlling device may elect to conduct a transaction in a legacy communication mode, in which a clock signal is transmitted over SCLK 1104. In some instances, the legacy communication mode by a subordinate device that is not configured for ADL-DDR transactions.

The ADL-DDR transaction can provide an equivalent data rate of 187.2 MHz on a serial bus that is clocked at 52 MHz. This data rate represents a gain of at least gain of 260% in throughput.

Examples of Processing Circuits and Methods

Figure 12:
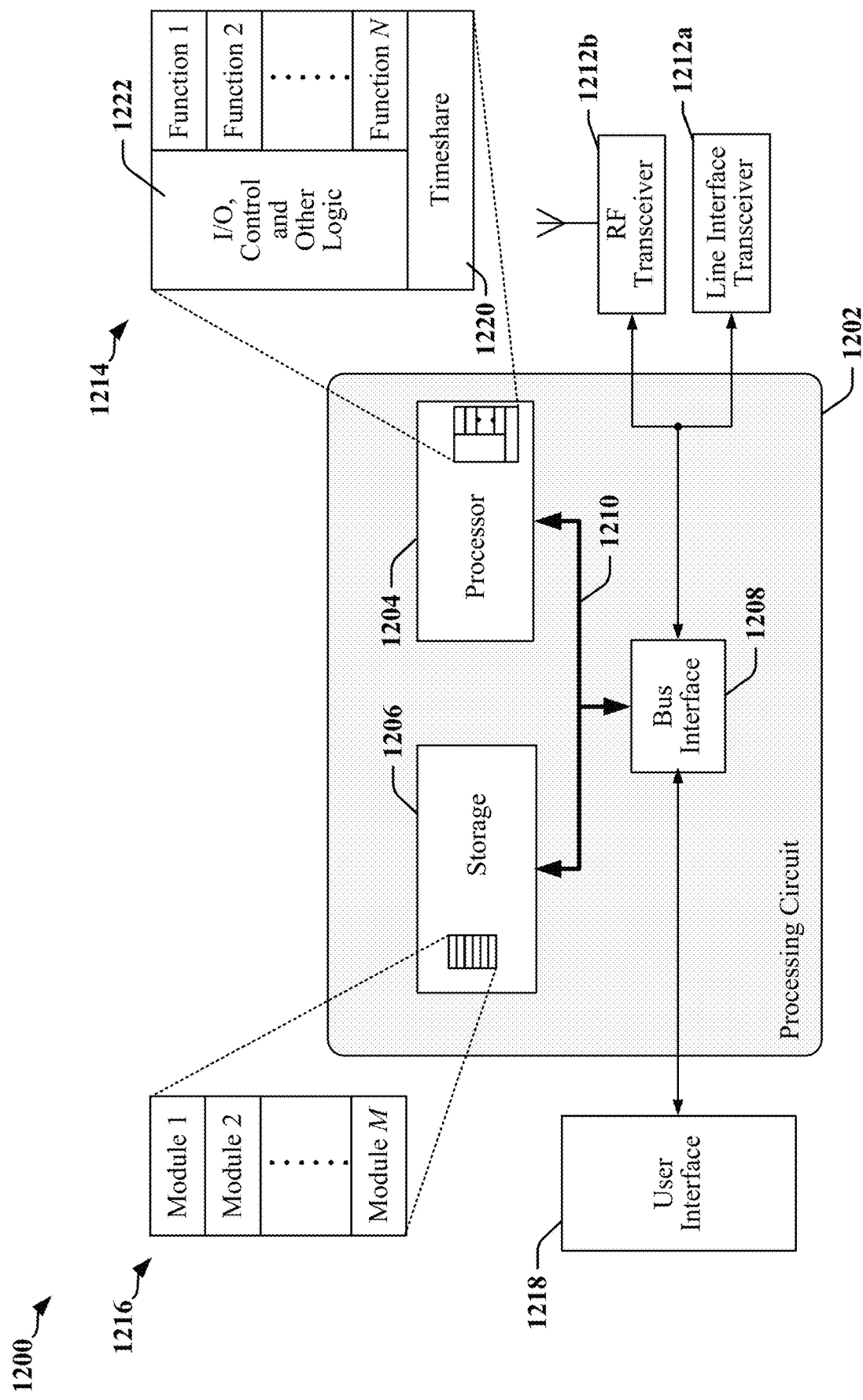
FIG. 12 illustrates one example of an apparatus employing a processing circuit that may be adapted according to certain aspects disclosed herein.

FIG. 12 is a diagram illustrating an example of a hardware implementation for an apparatus 1200. In some examples, the apparatus 1200 may perform one or more functions disclosed herein. In accordance with various aspects of the disclosure, an element, or any portion of an element, or any combination of elements as disclosed herein may be implemented using a processing circuit 1202. The processing circuit 1202 may include one or more processors 1204 that are controlled by some combination of hardware and software modules. Examples of processors 1204 include microprocessors, microcontrollers, DSPs, SoCs, ASICs, field programmable gate arrays (FPGAs), programmable logic devices (PLDs), state machines, sequencers, gated logic, discrete hardware circuits, and other suitable hardware configured to perform the various functionality described throughout this disclosure. The one or more processors 1204 may include specialized processors that perform specific functions, and that may be configured, augmented or controlled by one of the software modules 1216. The one or more processors 1204 may be configured through a combination of software modules 1216 loaded during initialization, and further configured by loading or unloading one or more software modules 1216 during operation.

In the illustrated example, the processing circuit 1202 may be implemented with a bus architecture, represented generally by the bus 1210. The bus 1210 may include any number of interconnecting buses and bridges depending on the specific application of the processing circuit 1202 and the overall design constraints. The bus 1210 links together various circuits including the one or more processors 1204, and storage 1206. Storage 1206 may include memory devices and mass storage devices, and may be referred to herein as computer-readable media and/or processor-readable media. The bus 1210 may also link various other circuits such as timing sources, timers, peripherals, voltage regulators, and power management circuits. A bus interface 1208 may provide an interface between the bus 1210 and one or more transceivers 1212a, 1212b. A transceiver 1212a, 1212b may be provided for each networking technology supported by the processing circuit. In some instances, multiple networking technologies may share some or all of the circuitry or processing modules found in a transceiver 1212a, 1212b. Each transceiver 1212a, 1212b provides a means for communicating with various other apparatus over a transmission medium. In one example, a transceiver 1212a may be used to couple the apparatus 1200 to a multi-wire bus. In another example, a transceiver 1212b may be used to connect the apparatus 1200 to a radio access network. Depending upon the nature of the apparatus 1200, a user interface 1218 (e.g., keypad, display, speaker, microphone, joystick) may also be provided, and may be communicatively coupled to the bus 1210 directly or through the bus interface 1208.

A processor 1204 may be responsible for managing the bus 1210 and for general processing that may include the execution of software stored in a computer-readable medium that may include the storage 1206. In this respect, the processing circuit 1202, including the processor 1204, may be used to implement any of the methods, functions and techniques disclosed herein. The storage 1206 may be used for storing data that is manipulated by the processor 1204 when executing software, and the software may be configured to implement any one of the methods disclosed herein.

One or more processors 1204 in the processing circuit 1202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1206 or in an external computer-readable medium. The external computer-readable medium and/or storage 1206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), RAM, ROM, a programmable read-only memory (PROM), an erasable PROM (EPROM) including EEPROM, a register, a removable disk, and any other suitable medium for storing software and/or instructions that may be accessed and read by a computer. The computer-readable medium and/or storage 1206 may also include, by way of example, a carrier wave, a transmission line, and any other suitable medium for transmitting software and/or instructions that may be accessed and read by a computer. Computer-readable medium and/or the storage 1206 may reside in the processing circuit 1202, in the processor 1204, external to the processing circuit 1202, or be distributed across multiple entities including the processing circuit 1202. The computer-readable medium and/or storage 1206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1206 may maintain software maintained and/or organized in loadable code segments, modules, applications, programs, etc., which may be referred to herein as software modules 1216. Each of the software modules 1216 may include instructions and data that, when installed or loaded on the processing circuit 1202 and executed by the one or more processors 1204, contribute to a run-time image 1214 that controls the operation of the one or more processors 1204. When executed, certain instructions may cause the processing circuit 1202 to perform functions in accordance with certain methods, algorithms and processes described herein.

Some of the software modules 1216 may be loaded during initialization of the processing circuit 1202, and these software modules 1216 may configure the processing circuit 1202 to enable performance of the various functions disclosed herein. For example, some software modules 1216 may configure internal devices and/or logic circuits 1222 of the processor 1204, and may manage access to external devices such as a transceiver 1212a, 1212b, the bus interface 1208, the user interface 1218, timers, mathematical coprocessors, and so on. The software modules 1216 may include a control program and/or an operating system that interacts with interrupt handlers and device drivers, and that controls access to various resources provided by the processing circuit 1202. The resources may include memory, processing time, access to a transceiver 1212a, 1212b, the user interface 1218, and so on.

One or more processors 1204 of the processing circuit 1202 may be multifunctional, whereby some of the software modules 1216 are loaded and configured to perform different functions or different instances of the same function. The one or more processors 1204 may additionally be adapted to manage background tasks initiated in response to inputs from the user interface 1218, the transceiver 1212a, 1212b, and device drivers, for example. To support the performance of multiple functions, the one or more processors 1204 may be configured to provide a multitasking environment, whereby each of a plurality of functions is implemented as a set of tasks serviced by the one or more processors 1204 as needed or desired. In one example, the multitasking environment may be implemented using a timesharing program 1220 that passes control of a processor 1204 between different tasks, whereby each task returns control of the one or more processors 1204 to the timesharing program 1220 upon completion of any outstanding operations and/or in response to an input such as an interrupt. When a task has control of the one or more processors 1204, the processing circuit is effectively specialized for the purposes addressed by the function associated with the controlling task. The timesharing program 1220 may include an operating system, a main loop that transfers control on a round-robin basis, a function that allocates control of the one or more processors 1204 in accordance with a prioritization of the functions, and/or an interrupt driven main loop that responds to external events by providing control of the one or more processors 1204 to a handling function.

The processing circuit 1202 may be configured to perform one or more of the functions disclosed herein. For example, the processing circuit 1202 may be configured to operate as a master device coupled to a serial bus. The processing circuit 1202 may be configured to initiate a pulse on a wire coupling the processing circuit 1202 to a subordinate device, present a high impedance to the wire after initiating the pulse and determine whether a subordinate device has terminated the pulse early, indicating a first encoded value. When the subordinate device has not terminated the pulse, processing circuit 1202 may be configured to terminate the pulse after a duration of time sufficient to indicate a second encoded value. In one example, the first encoded value is assigned binary 1 and the second encoded value is assigned binary 0. In another example, the first encoded value is assigned binary 0 and the second encoded value is assigned binary 1. The processing circuit 1202 may be configured to determine the encoded value or may employ a separate PWM decoder.

Figure 13:
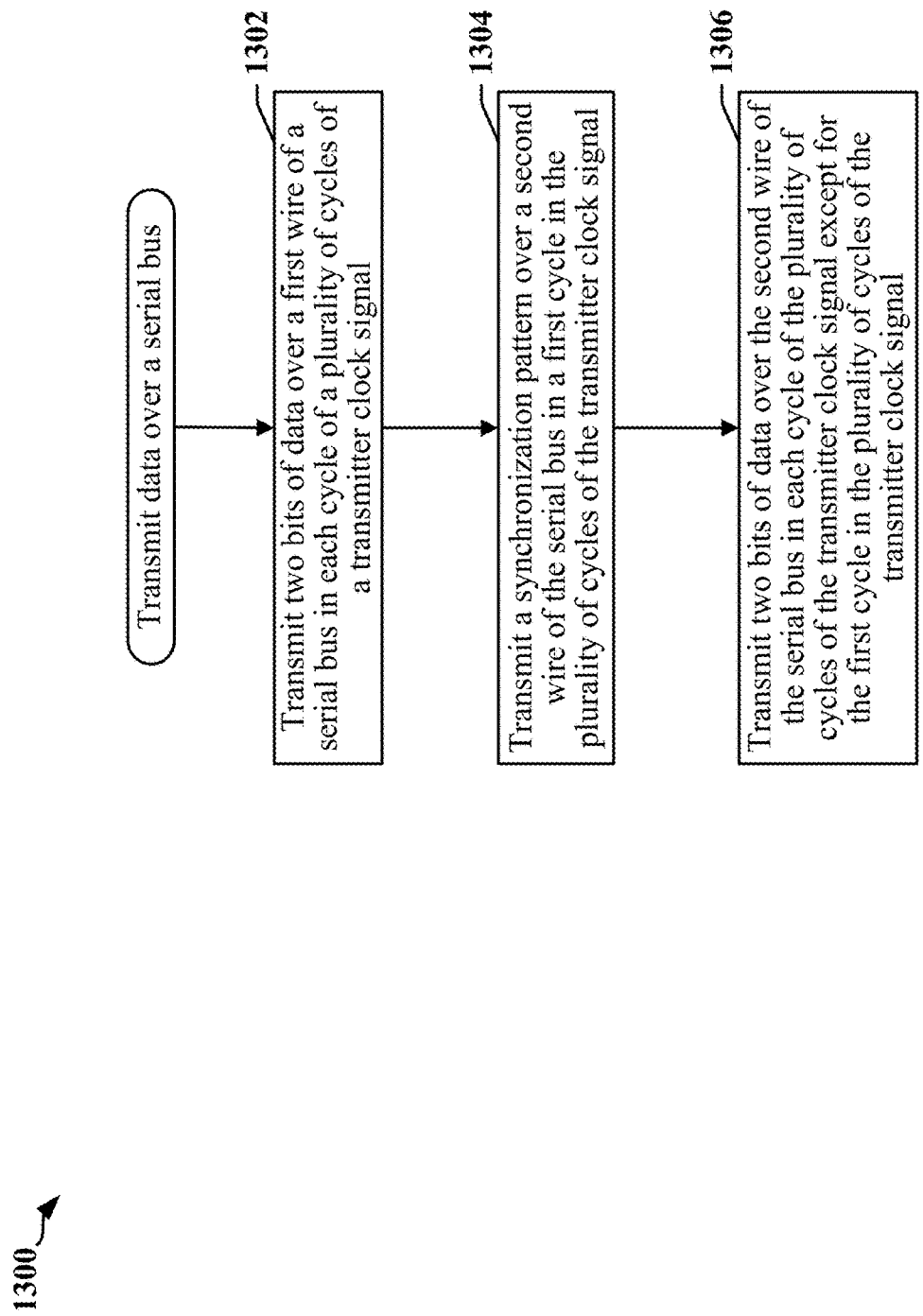
FIG. 13 is a flowchart that illustrates a method for transmitting data over a serial bus in accordance with certain aspects disclosed herein.

FIG. 13 is a flowchart 1300 of a method for transmitting data over a serial bus. The data may be formatted according to RFFE protocols. The data may be transmitted in one or more ADL-DDR transactions.

At block 1302, two bits of data may be transmitted over a first wire of a serial bus in each cycle of a plurality of cycles of a transmitter clock signal. At block 1304, a synchronization pattern may be transmitted over a second wire of the serial bus in a first cycle in the plurality of cycles of the transmitter clock signal. At block 1306, two bits of data may be transmitted over the second wire of the serial bus in each cycle of the plurality of cycles of the transmitter clock signal except for the first cycle in the plurality of cycles of the transmitter clock signal. In one example, 16 bits of data and 2 parity bits are transmitted in five cycles of the plurality of cycles of the transmitter clock signal. In one implementation, two bits of data transmitted over the serial bus in one of the plurality of cycles of the transmitter clock signal include parity or error correction information.

In some implementations, the synchronization pattern may include a transition in signaling state of the second wire between two half cycles of the transmitter clock signal. The synchronization pattern may be transmitted in a first-transmitted cycle or a last-transmitted cycle of the plurality of cycles of the transmitter clock signal.

A termination pattern may be transmitted over the second wire of the serial bus in a subsequent plurality of cycles of the transmitter clock signal. In some implementations, signaling state of the second wire does not change during transmission of the termination pattern.

Figure 14:
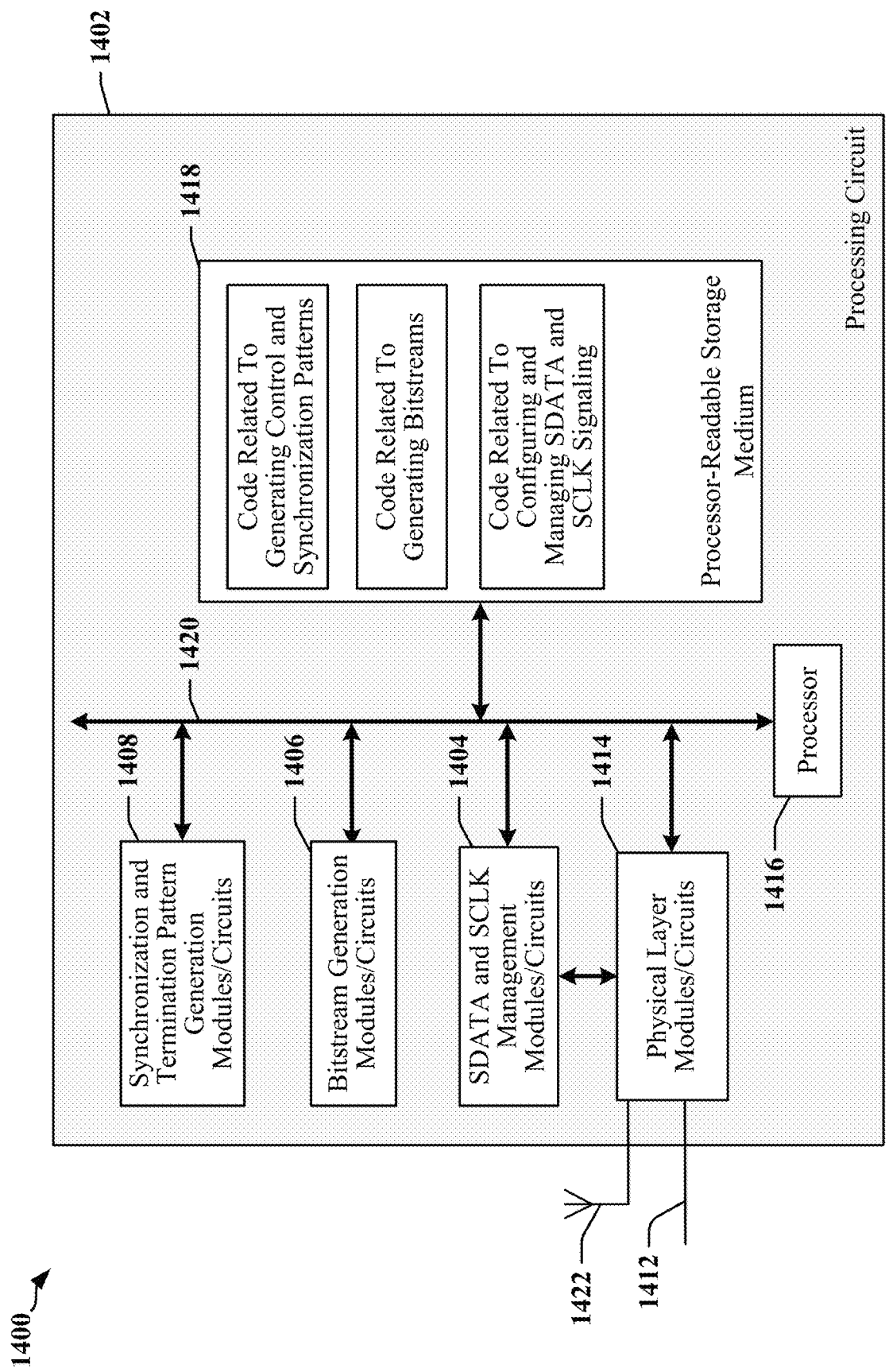
FIG. 14 illustrates an example of a hardware implementation for an apparatus adapted in accordance with certain aspects disclosed herein.

FIG. 14 is a diagram illustrating an example of a hardware implementation for an apparatus 1400 employing a processing circuit 1402. The processing circuit typically has a controller or processor 1416 that may include one or more microprocessors, microcontrollers, digital signal processors, sequencers and/or state machines. The processing circuit 1402 may be implemented with a bus architecture, represented generally by the bus 1420. The bus 1420 may include any number of interconnecting buses and bridges depending on the specific application of the processing circuit 1402 and the overall design constraints. The bus 1420 links together various circuits including one or more processors and/or hardware modules, represented by the controller or processor 1416, the modules or circuits 1404, 1406 and 1408 and the processor-readable storage medium 1418. One or more physical layer circuits and/or modules 1414 may be provided to support communication over a communication link implemented using a multi-wire bus 1412, through an antenna or antenna array 1422 (to a radio access network for example), and so on. The bus 1420 may also link various other circuits such as timing sources, peripherals, voltage regulators, and power management circuits, which are well known in the art, and therefore, will not be described any further.

The processor 1416 is responsible for general processing, including the execution of software, code and/or instructions stored on the processor-readable storage medium 1418. The processor-readable storage medium 1418 may include a non-transitory storage medium. The software, when executed by the processor 1416, causes the processing circuit 1402 to perform the various functions described herein, and for any particular apparatus. The processor-readable storage medium 1418 may be used for storing data that is manipulated by the processor 1416 when executing software. The processing circuit 1402 further includes at least one of the modules 1404, 1406 and 1408. The modules 1404, 1406 and 1408 may be software modules running in the processor 1416, resident/stored in the processor-readable storage medium 1418, one or more hardware modules coupled to the processor 1416, or some combination thereof. The modules 1404, 1406 and 1408 may include microcontroller instructions, state machine configuration parameters, or some combination thereof.

In one configuration, the apparatus 1400 includes modules and/or circuits 1404 that interact with the physical layer circuits and/or modules 1414 to configure functionality of SDATA and SCLK lines of a serial bus. In one mode, the SCLK may be configured to operate as a clock lane and in another mode the SCLK may be configured to carry data signals. The apparatus 1400 further includes modules and/or circuits 1406 configured or adapted to generate bitstreams for transmission over SDATA and SCLK. The modules and/or circuits 1406 may include multiplexers and/or serializers configured to receive parallel data and generate interleaved and/or multiplexed bitstreams for transmission over SDATA and SCLK. The apparatus 1400 further includes modules and/or circuits 1408 configured or adapted to generate synchronization patterns and termination patterns defined for an ADL-DDR conducted in accordance with certain aspects of this disclosure.

In one example, the apparatus 1400 includes physical layer circuits and/or modules 1414 that implement an interface circuit with at least one line driver adapted or configured to couple the apparatus 1400 to a two-wire serial bus. The apparatus 1400 may have a processor 1416 or protocol controller. The apparatus 1400 may include or be coupled to one or more keeper circuits through the two-wire serial bus. The keeper circuits may be operable to maintain a constant signaling state of the two-wire serial bus at signaling state when no device is actively driving one or more wires of the two-wire serial bus.

In an example, the apparatus 1400 includes means for transmitting two bits of data over a first wire of a serial bus in each cycle of a plurality of cycles of a transmitter clock signal, means for transmitting a synchronization pattern over a second wire of the serial bus in a first cycle in the plurality of cycles of the transmitter clock signal, and means for transmitting two bits of data over the second wire of the serial bus in each cycle of the plurality of cycles of the transmitter clock signal except for the first cycle in the plurality of cycles of the transmitter clock signal.

In one example, 16 bits of data and 2 parity bits are transmitted in five cycles of the plurality of cycles of the transmitter clock signal. In another example, two bits of data transmitted over the serial bus in one of the plurality of cycles of the transmitter clock signal includes parity or error correction information.

In some implementations, the synchronization pattern includes a transition in signaling state of the second wire between two half cycles of the transmitter clock signal. In some instances, the synchronization pattern may be transmitted in a first-transmitted cycle or a last-transmitted cycle of the plurality of cycles of the transmitter clock signal.

A termination pattern may be transmitted over the second wire of the serial bus over the second wire of the serial bus in a subsequent plurality of cycles of the transmitter clock signal. The signaling state of the second wire does not change during transmission of the termination pattern. In one example, data and parity bits are transmitted in accordance with an RFFE protocol.

The processor-readable storage medium 1418 may include software, code and/or instructions configured to cause the processor 1416 to transmit two bits of data over a first wire of a serial bus in each cycle of a plurality of cycles of a transmitter clock signal, transmit a synchronization pattern over a second wire of the serial bus in a first cycle in the plurality of cycles of the transmitter clock signal, and transmit two bits of data over the second wire of the serial bus in each cycle of the plurality of cycles of the transmitter clock signal except for the first cycle in the plurality of cycles of the transmitter clock signal.

In one example, 16 bits of data and 2 parity bits are transmitted in five cycles of the plurality of cycles of the transmitter clock signal. Two bits of data transmitted over the serial bus in one of the plurality of cycles of the transmitter clock signal include parity information.

In some implementations, synchronization pattern includes a transition in signaling state of the second wire between two half cycles of the transmitter clock signal. The synchronization pattern may be transmitted in a first-transmitted cycle or a last-transmitted cycle of the plurality of cycles of the transmitter clock signal.

The processor-readable storage medium 1418 may include further software, code and/or instructions configured to cause the processor 1416 to transmit a termination pattern over the second wire of the serial bus in a subsequent plurality of cycles of the transmitter clock signal. Signaling state of the second wire does not change during transmission of the termination pattern.

Figure 15:
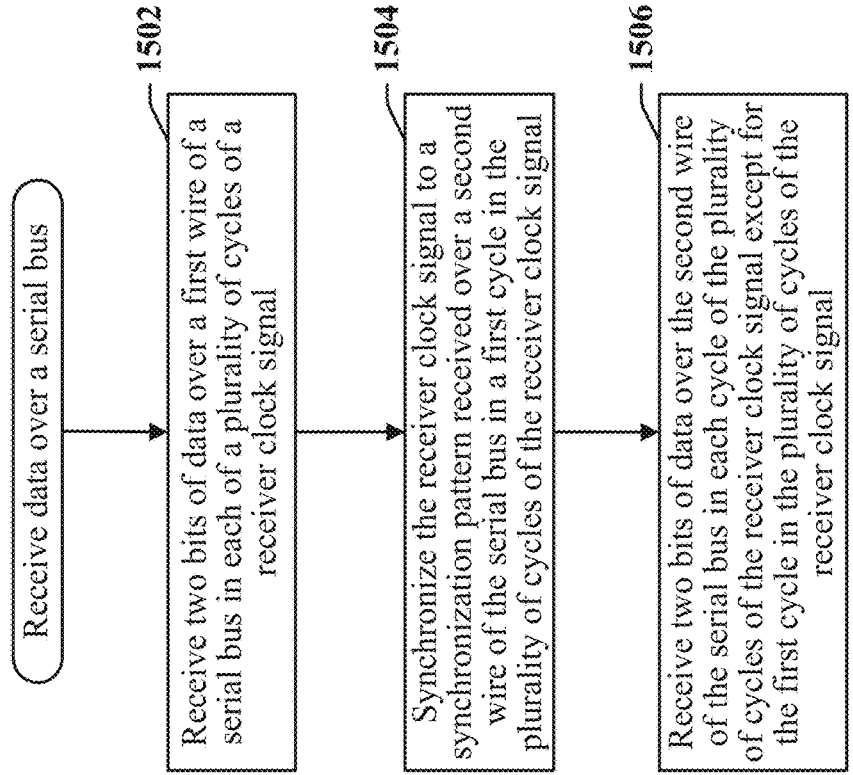
FIG. 15 is a flowchart that illustrates a method for receiving data over a serial bus in accordance with certain aspects disclosed herein.

FIG. 15 is a flowchart 1500 of a method for receiving data over a serial bus. The data may be formatted according to RFFE protocols. The data may be received in one or more ADL-DDR transactions.

At block 1502, two bits of data may be received over a first wire of a serial bus in each of a plurality of cycles of a receiver clock signal. At block 1504, the receiver clock signal may be synchronized to a synchronization pattern received over a second wire of the serial bus in a first cycle in the plurality of cycles of the receiver clock signal. At block 1506, two bits of data may be received over the second wire of the serial bus in each cycle of the plurality of cycles of the receiver clock signal except for the first cycle in the plurality of cycles of the receiver clock signal. In one example, 16 bits of data and 2 parity bits are received in five cycles of the plurality of cycles of the receiver clock signal. Two bits of data received over the serial bus in one of the plurality of cycles of the receiver clock signal include parity information.

In some implementations, the synchronization pattern may include a transition in signaling state of the second wire between two half cycles of the receiver clock signal. The synchronization pattern may be received in a first-received cycle or a last-received cycle of the plurality of cycles of the receiver clock signal.

A termination pattern may be received over the second wire of the serial bus in a subsequent plurality of cycles of the receiver clock signal. The signaling state of the second wire does not change for the duration of the termination pattern.

Figure 16:
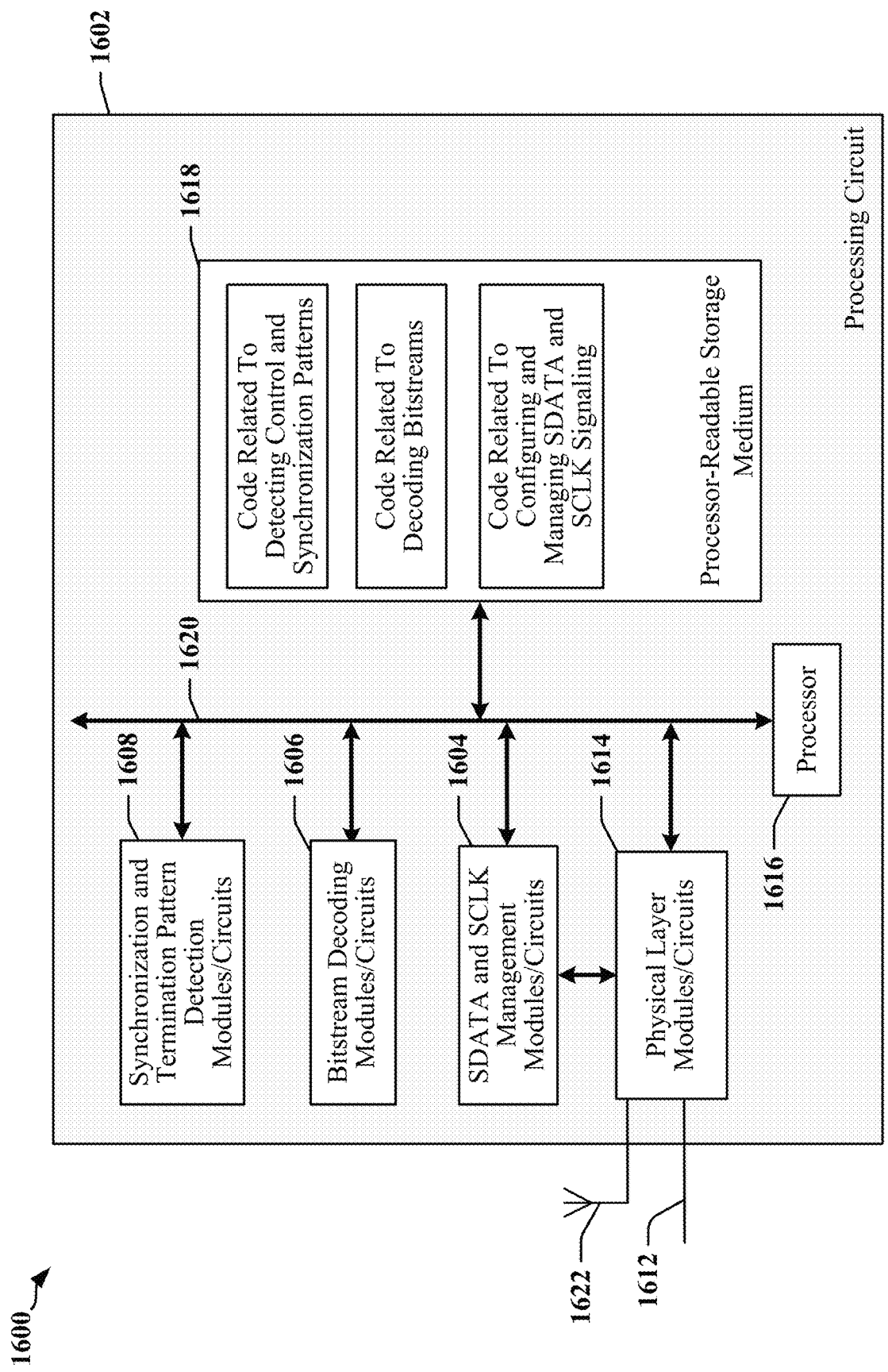
FIG. 16 illustrates an example of a hardware implementation for an apparatus adapted in accordance with certain aspects disclosed herein.

FIG. 16 is a diagram illustrating an example of a hardware implementation for an apparatus 1600 employing a processing circuit 1602. The processing circuit typically has a controller or processor 1616 that may include one or more microprocessors, microcontrollers, digital signal processors, sequencers and/or state machines. The processing circuit 1602 may be implemented with a bus architecture, represented generally by the bus 1620. The bus 1620 may include any number of interconnecting buses and bridges depending on the specific application of the processing circuit 1602 and the overall design constraints. The bus 1620 links together various circuits including one or more processors and/or hardware modules, represented by the controller or processor 1616, the modules or circuits 1604, 1606 and 1608 and the processor-readable storage medium 1618. One or more physical layer circuits and/or modules 1614 may be provided to support communication over a communication link implemented using a multi-wire bus 1612, through an antenna or antenna array 1622 (to a radio access network for example), and so on. The bus 1620 may also link various other circuits such as timing sources, peripherals, voltage regulators, and power management circuits, which are well known in the art, and therefore, will not be described any further.

The processor 1616 is responsible for general processing, including the execution of software, code and/or instructions stored on the processor-readable storage medium 1618. The processor-readable storage medium 1618 may include a non-transitory storage medium. The software, when executed by the processor 1616, causes the processing circuit 1602 to perform the various functions described herein, and for any particular apparatus. The processor-readable storage medium 1618 may be used for storing data that is manipulated by the processor 1616 when executing software. The processing circuit 1602 further includes at least one of the modules 1604, 1606 and 1608. The modules 1604, 1606 and 1608 may be software modules running in the processor 1616, resident/stored in the processor-readable storage medium 1618, one or more hardware modules coupled to the processor 1616, or some combination thereof. The modules 1604, 1606 and 1608 may include microcontroller instructions, state machine configuration parameters, or some combination thereof.

In one configuration, the apparatus 1600 includes modules and/or circuits 1604 that interact with the physical layer circuits and/or modules 1614 to configure functionality of SDATA and SCLK lines of a serial bus. In one mode, the SCLK may be configured to operate as a clock lane and in another mode the SCLK may be configured to carry data signals. The apparatus 1600 further includes modules and/or circuits 1606 configured or adapted to decode bitstreams received over SDATA and SCLK. The modules and/or circuits 1606 may include multiplexers and/or deserializers configured to receive interleaved and/or multiplexed bitstreams received over SDATA and SCLK and recover parallel data. The apparatus 1600 further includes modules and/or circuits 1608 configured or adapted to detect, recognize and/or respond to synchronization patterns and termination patterns defined for an ADL-DDR conducted in accordance with certain aspects of this disclosure.

In one example, the apparatus 1600 includes physical layer circuits and/or modules 1614 that implement an interface circuit with at least one line driver adapted or configured to couple the apparatus 1600 to a two-wire serial bus. The apparatus 1600 may have a processor 1616 or protocol controller. The apparatus 1600 may include or be coupled to one or more keeper circuits through the two-wire serial bus. The keeper circuits may be operable to maintain a constant signaling state of the two-wire serial bus at signaling state when no device is actively driving one or more wires of the two-wire serial bus.

In an example, the apparatus 1600 includes means for receiving two bits of data over a first wire of a serial bus in each of a plurality of cycles of a receiver clock signal, means for synchronizing the receiver clock signal to a synchronization pattern received over a second wire of the serial bus in a first cycle in the plurality of cycles of the receiver clock signal, and means for receiving two bits of data over the second wire of the serial bus in each cycle of the plurality of cycles of the receiver clock signal except for the first cycle in the plurality of cycles of the receiver clock signal.

In one example, 16 bits of data and 2 parity bits are received in five cycles of the plurality of cycles of the receiver clock signal. Two bits of data received over the serial bus in one of the plurality of cycles of the receiver clock signal may include parity or error checking information.

In some implementations, the synchronization pattern includes a transition in signaling state of the second wire between two half cycles of the receiver clock signal. The synchronization pattern may be received in a first-transmitted cycle or a last-transmitted cycle of the plurality of cycles of the receiver clock signal.

A termination pattern may be received over the second wire of the serial bus in one cycle of a subsequent plurality of cycles of the receiver clock signal. The signaling state of the second wire does not change during reception of the termination pattern. In one example, data and parity bits are received in accordance with an RFFE protocol.

The processor-readable storage medium 1618 may include software, code and/or instructions configured to cause the processor 1616 to receive two bits of data over a first wire of a serial bus in each of a plurality of cycles of a receiver clock signal, synchronize the receiver clock signal to a synchronization pattern received over a second wire of the serial bus in a first cycle in the plurality of cycles of the receiver clock signal, and receive two bits of data over the second wire of the serial bus in each cycle of the plurality of cycles of the receiver clock signal except for the first cycle in the plurality of cycles of the receiver clock signal.

In one example, 16 bits of data and 2 parity bits are received in five cycles of the plurality of cycles of the receiver clock signal. Two bits of data received over the serial bus in one of the plurality of cycles of the receiver clock signal may include parity or error checking information.

In some implementations, the synchronization pattern includes a transition in signaling state of the second wire between two half cycles of the receiver clock signal. The synchronization pattern may be received in a first-transmitted cycle or a last-transmitted cycle of the plurality of cycles of the receiver clock signal.

A termination pattern may be received over the second wire of the serial bus in one cycle of a subsequent plurality of cycles of the receiver clock signal. The signaling state of the second wire does not change during reception of the termination pattern. In one example, data and parity bits are received in accordance with an RFFE protocol.

The processor-readable storage medium 1618 may include further software, code and/or instructions configured to cause the processor 1616 to detect or recognize a termination pattern received over the second wire of the serial bus in one cycle of a subsequent plurality of cycles of the receiver clock signal. The signaling state of the second wire does not change during reception of the termination pattern. In one example, data and parity bits are received in accordance with an RFFE protocol.

Some implementation examples are described in the following numbered clauses:

1. A method for transmitting data over a serial bus, comprising: transmitting two bits of data over a first wire of a serial bus in each cycle of a plurality of cycles of a transmitter clock signal; transmitting a synchronization pattern over a second wire of the serial bus in a first cycle in the plurality of cycles of the transmitter clock signal; and transmitting two bits of data over the second wire of the serial bus in each cycle of the plurality of cycles of the transmitter clock signal except for the first cycle in the plurality of cycles of the transmitter clock signal.
2. The method as described in clause 1, wherein 16 bits of data and 2 parity bits are transmitted in five cycles of the plurality of cycles of the transmitter clock signal.
3. The method as described in clause 1, wherein two bits of data transmitted over the serial bus in one of the plurality of cycles of the transmitter clock signal comprise parity information.
4. The method as described in any of clauses 1-3, wherein the synchronization pattern comprises a transition in signaling state of the second wire between two half cycles of the transmitter clock signal.
5. The method as described in any of clauses 1-4, wherein the synchronization pattern is transmitted in a first-transmitted cycle or a last-transmitted cycle of the plurality of cycles of the transmitter clock signal.
6. The method as described in any of clauses 1-5, further comprising: transmitting a termination pattern over the second wire of the serial bus in a subsequent plurality of cycles of the transmitter clock signal.
7. The method as described in clause 6, wherein signaling state of the second wire does not change during transmission of the termination pattern.
8. The method as described in any of clauses 1-7, wherein 16 bits of data and 2 parity or error checking bits are transmitted in the plurality of cycles of the transmitter clock signal in accordance with a Radio Frequency Front-End (RFFE) protocol.
9. A method for receiving data over a serial bus, comprising: receiving two bits of data over a first wire of a serial bus in each of a plurality of cycles of a receiver clock signal; synchronizing the receiver clock signal to a synchronization pattern received over a second wire of the serial bus in a first cycle in the plurality of cycles of the receiver clock signal; and receiving two bits of data over the second wire of the serial bus in each cycle of the plurality of cycles of the receiver clock signal except for the first cycle in the plurality of cycles of the receiver clock signal.
10. The method as described in clause 9, wherein 16 bits of data and 2 parity bits are received in five cycles of the plurality of cycles of the receiver clock signal.
11. The method as described in clause 9, wherein two bits of data received over the serial bus in one of the plurality of cycles of the receiver clock signal comprise parity information.
12. The method as described in any of clauses 9-11, wherein the synchronization pattern comprises a transition in signaling state of the second wire between two half cycles of the receiver clock signal.
13. The method as described in any of clauses 9-12, wherein the synchronization pattern is received in a first-transmitted cycle or a last-transmitted cycle of the plurality of cycles of the receiver clock signal.
14. The method as described in any of clauses 9-13, further comprising: receiving a termination pattern over the second wire of the serial bus in one cycle of a subsequent plurality of cycles of the receiver clock signal.
15. The method as described in clause 14, wherein signaling state of the second wire does not change during transmission of the termination pattern.
16. The method as described in any of clauses 9-15, wherein 16 bits of data and 2 parity or error checking bits are received in the plurality of cycles of the receiver clock signal in accordance with a Radio Frequency Front-End (RFFE) protocol.
17. A processor-readable storage medium storing code thereon, the code when executed by a processor causes a processing circuit to: transmit two bits of data over a first wire of a serial bus in each cycle of a plurality of cycles of a transmitter clock signal; transmit a synchronization pattern over a second wire of the serial bus in a first cycle in the plurality of cycles of the transmitter clock signal; and transmit two bits of data over the second wire of the serial bus in each cycle of the plurality of cycles of the transmitter clock signal except for the first cycle in the plurality of cycles of the transmitter clock signal.
18. The processor-readable storage medium as described in clause 17, wherein 16 bits of data and 2 parity bits are transmitted in five cycles of the plurality of cycles of the receiver clock signal.
19. The processor-readable storage medium as described in clause 17 or clause 18, wherein the synchronization pattern comprises a transition in signaling state of the second wire between two half cycles of the transmitter clock signal.

20. The processor-readable storage medium as described in any of clauses 17-19, wherein the code further causes the processing circuit to: transmit a termination pattern over the second wire of the serial bus in a subsequent plurality of cycles of the transmitter clock signal 21. The processor-readable storage medium as described in clause 20, wherein signaling state of the second wire does not change during transmission of the termination pattern.

22. A processor-readable storage medium storing code thereon, the code when executed by a processor causes a processing circuit to: receive two bits of data over a first wire of a serial bus in each of a plurality of cycles of a receiver clock signal; synchronize the receiver clock signal to a synchronization pattern received over a second wire of the serial bus in a first cycle in the plurality of cycles of the receiver clock signal; and receive two bits of data over the second wire of the serial bus in each cycle of the plurality of cycles of the receiver clock signal except for the first cycle in the plurality of cycles of the receiver clock signal.

23. The processor-readable storage medium as described in clause 22, wherein 16 bits of data and 2 parity bits are received in five cycles of the plurality of cycles of the receiver clock signal.

24. The processor-readable storage medium as described in clause 22, wherein two bits of data received over the serial bus in one of the plurality of cycles of the receiver clock signal comprise parity information.

25. The processor-readable storage medium as described in any of clauses 22-24, wherein the synchronization pattern comprises a transition in signaling state of the second wire between two half cycles of the receiver clock signal.

26. The processor-readable storage medium as described in clause 25, wherein the synchronization pattern is received in a first-transmitted cycle or a last-transmitted cycle of the plurality of cycles of the receiver clock signal.

27. The processor-readable storage medium as described in any of clauses 22-26, wherein the code further causes the processing circuit to: receive a termination pattern over the second wire of the serial bus in one cycle of a subsequent plurality of cycles of the receiver clock signal.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for transmitting data over a serial bus, comprising:
   transmitting two bits of data over a first wire of a serial bus in each cycle of a plurality of cycles of a transmitter clock signal;
   transmitting a synchronization pattern over a second wire of the serial bus in a first cycle in the plurality of cycles of the transmitter clock signal; and
   transmitting two bits of data over the second wire of the serial bus in each cycle of the plurality of cycles of the transmitter clock signal except for the first cycle in the plurality of cycles of the transmitter clock signal.

2. The method of claim 1, wherein 16 bits of data and 2 parity bits are transmitted in five cycles of the plurality of cycles of the transmitter clock signal.

3. The method of claim 1, wherein two bits of data transmitted over the serial bus in one of the plurality of cycles of the transmitter clock signal comprise parity information.

4. The method of claim 1, wherein the synchronization pattern comprises a transition in signaling state of the second wire between two half cycles of the transmitter clock signal.

5. The method of claim 1, wherein the synchronization pattern is transmitted in a first-transmitted cycle or a last-transmitted cycle of the plurality of cycles of the transmitter clock signal.

6. The method of claim 1, further comprising:
   transmitting a termination pattern over the second wire of the serial bus in a subsequent plurality of cycles of the transmitter clock signal.

7. The method of claim 6, wherein signaling state of the second wire does not change during transmission of the termination pattern.

8. A method for receiving data over a serial bus, comprising:
   receiving two bits of data over a first wire of a serial bus in each of a plurality of cycles of a receiver clock signal;
   synchronizing the receiver clock signal to a synchronization pattern received over a second wire of the serial bus in a first cycle in the plurality of cycles of the receiver clock signal; and
   receiving two bits of data over the second wire of the serial bus in each cycle of the plurality of cycles of the receiver clock signal except for the first cycle in the plurality of cycles of the receiver clock signal.

9. The method of claim 8, wherein 16 bits of data and 2 parity bits are received in five cycles of the plurality of cycles of the receiver clock signal.

10. The method of claim 8, wherein two bits of data received over the serial bus in one of the plurality of cycles of the receiver clock signal comprise parity information.

11. The method of claim 8, wherein the synchronization pattern comprises a transition in signaling state of the second wire between two half cycles of the receiver clock signal.

12. The method of claim 8, wherein the synchronization pattern is received in a first-transmitted cycle or a last-transmitted cycle of the plurality of cycles of the receiver clock signal.

13. The method of claim 8, further comprising:
receiving a termination pattern over the second wire of the serial bus in one cycle of a subsequent plurality of cycles of the receiver clock signal.

14. The method of claim 13, wherein signaling state of the second wire does not change during transmission of the termination pattern.

15. A non-transitory processor-readable storage medium storing code thereon, the code when executed by a processor causes a processing circuit to:
transmit two bits of data over a first wire of a serial bus in each cycle of a plurality of cycles of a transmitter clock signal;
transmit a synchronization pattern over a second wire of the serial bus in a first cycle in the plurality of cycles of the transmitter clock signal; and
transmit two bits of data over the second wire of the serial bus in each cycle of the plurality of cycles of the transmitter clock signal except for the first cycle in the plurality of cycles of the transmitter clock signal.

16. The non-transitory processor-readable storage medium of claim 15, wherein 16 bits of data and 2 parity bits are transmitted in five cycles of the plurality of cycles of the transmitter clock signal.

17. The non-transitory processor-readable storage medium of claim 15, wherein the synchronization pattern comprises a transition in signaling state of the second wire between two half cycles of the transmitter clock signal.

18. The non-transitory processor-readable storage medium of claim 15, wherein the synchronization pattern is transmitted in a first-transmitted cycle or a last-transmitted cycle of the plurality of cycles of the transmitter clock signal.

19. The non-transitory processor-readable storage medium of claim 15, wherein the code further causes the processing circuit to:
transmit a termination pattern over the second wire of the serial bus in a subsequent plurality of cycles of the transmitter clock signal.

20. The non-transitory processor-readable storage medium of claim 19, wherein signaling state of the second wire does not change during transmission of the termination pattern.

* * * * *